United States Patent
Hong et al.

(10) Patent No.: US 11,212,775 B2
(45) Date of Patent: Dec. 28, 2021

(54) METHOD AND DEVICE FOR SIDELINK COMMUNICATION IN WIRELESS COMMUNICATION SYSTEM

(71) Applicant: LG Electronics Inc., Seoul (KR)

(72) Inventors: Uihyun Hong, Seoul (KR); Hanbyul Seo, Seoul (KR); Seungmin Lee, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/649,581

(22) PCT Filed: Sep. 21, 2018

(86) PCT No.: PCT/KR2018/011236
§ 371 (c)(1),
(2) Date: Mar. 20, 2020

(87) PCT Pub. No.: WO2019/059707
PCT Pub. Date: Mar. 28, 2019

(65) Prior Publication Data
US 2020/0260413 A1  Aug. 13, 2020

Related U.S. Application Data

(60) Provisional application No. 62/565,066, filed on Sep. 28, 2017, provisional application No. 62/562,998, (Continued)

(51) Int. Cl.
*H04W 72/02* (2009.01)
*H04L 5/00* (2006.01)
*H04W 92/18* (2009.01)

(52) U.S. Cl.
CPC ........... *H04W 72/02* (2013.01); *H04L 5/0039* (2013.01); *H04L 5/0041* (2013.01); *H04L 5/0082* (2013.01); *H04W 92/18* (2013.01)

(58) Field of Classification Search
CPC ..... H04W 72/02; H04W 92/18; H04W 76/14; H04L 5/0039; H04L 5/0041; H04L 5/0082; H04L 5/0078; H04L 5/0044
See application file for complete search history.

(56) References Cited

U.S. PATENT DOCUMENTS

2012/0327830 A1* 12/2012 Hamaguchi ............ H04J 11/003
370/311
2016/0295624 A1* 10/2016 Novlan ................. H04W 72/04
2017/0002085 A1    7/2017 Chae et al.

FOREIGN PATENT DOCUMENTS

WO    WO2017/146781    8/2017

OTHER PUBLICATIONS

Alcatel-Lucent "System Level Consideration and evaluation for V2V communication",3GPP TSG RAN WG1 Meeting #83, RI-156978, 7 pages (Year: 2015).*

(Continued)

*Primary Examiner* — Ivan O Latorre
(74) *Attorney, Agent, or Firm* — Fish & Richardson P.C.

(57) ABSTRACT

A method and apparatus for a sidelink of a wireless communication system are proposed. A transmission UE can contiguously or non-contiguously allocate radio resources through sidelink communication. A specific resource allocation method is selected in consideration of latency of sidelink data/packets or other factors. For example, a specific resource allocation method can be determined based on whether a plurality of contiguous subchannels is allocated to radio resources before a first time, which is determined based on latency of data/packets.

16 Claims, 28 Drawing Sheets

Related U.S. Application Data filed on Sep. 25, 2017, provisional application No. 62/561,632, filed on Sep. 21, 2017.

(56) References Cited

OTHER PUBLICATIONS

Ericsson, "Reducing time-to-transmit for V2X", R1-1712661, 3GPP TSG RAN WG1 Meeting #90, Prague, Czech Republic, Aug. 21-25, 2017, 2 pages.

Lenovo, Motorola Mobility, "Discussion on sidelink resource allocation and configuration", R1-1712687, 3GPP TSG RAN WG1 Meeting #90, Prague, P.R. Czechia Aug. 21-25, 2017, 3 pages.

LG Electronics, "Discussion on maximum time reduction between packet arrival and selected transmission resource", R1-1713094, 3GPP TSG RAN WG1 Meeting #90, Prague, Czechia, Aug. 21-25, 2017, 2 pages.

\* cited by examiner

FIG. 8
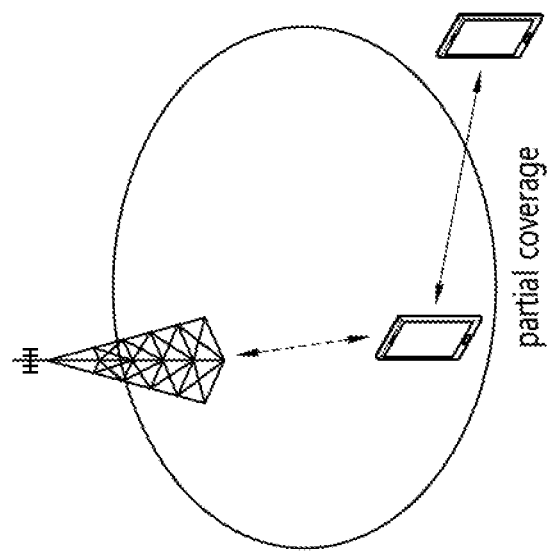
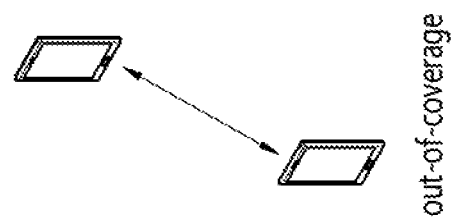
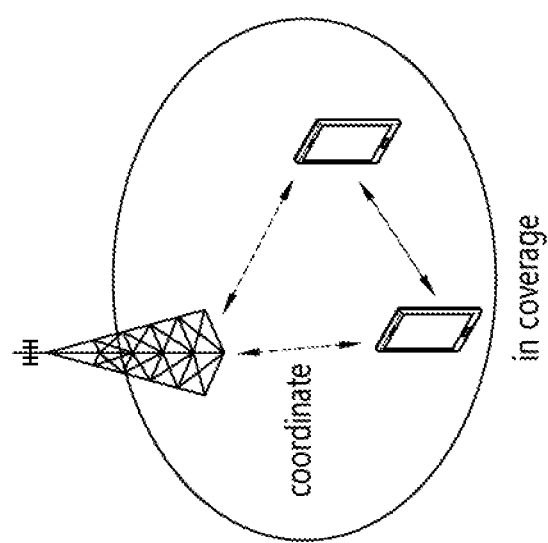

METHOD AND DEVICE FOR SIDELINK COMMUNICATION IN WIRELESS COMMUNICATION SYSTEM

CROSS-REFERENCE TO RELATED APPLICATIONS

This application is a National Stage application under 35 U.S.C. § 371 of International Application No. PCT/KR2018/011236, filed on Sep. 21, 2018, which claims the benefit of U.S. Provisional Application No. 62/561,632, filed on Sep. 21, 2017, 62/562,998, filed on Sep. 25, 2017, and 62/565,066, filed on Sep. 28, 2017. The disclosures of the prior applications are incorporated by reference in their entirety.

BACKGROUND

Technical Field

The present document relates to a wireless communication system supporting sidelink and, more specifically, to a method and apparatus for supporting an enhanced communication method between a UE and a base station supporting sidelink.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, 3$^{rd}$ Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D22) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

D2D operation may have various advantages in that it is communication between devices in proximity. For example, D2D UE has a high transfer rate and a low delay and may perform data communication. Furthermore, in D2D operation, traffic concentrated on a base station can be distributed. If D2D UE plays the role of a relay, it may also play the role of extending coverage of a base station.

The above-described D2D communication may be expanded and applied to signal transmission and/or reception between vehicles. Most particularly, vehicle-related communication is referred to as vehicle-to-everything (V2X) communication.

In V2X, the term 'X' may refer to a pedestrian, a vehicle, an infrastructure/network, and so on, which may be respectively indicated as V2P, V2V, and V2I/N.

SUMMARY

The present specification proposes an enhanced method and apparatus applicable to sidelink/D2D/V2X communication. Specifically, the present specification proposes a method and apparatus for performing communication in which delay is improved by efficiently using radio resources allocated for sidelink/D2D/V2X communication.

An example of the present specification proposes a method for a sidelink of a wireless communication system. Specifically, a transmission UE acquires information related to radio resources allocated for the sidelink, and the radio resources may include a plurality of subchannels and a plurality of time units. In addition, the transmission UE may generate data to be transmitted through the radio resources. Further, the transmission UE may start transmission of the data based on the radio resources. Further, based on whether a plurality of contiguous subchannels is allocated to radio resources before a first time from among the radio resources, the transmission UE starts transmission of the data through the plurality of contiguous subchannels or starts transmission of the data after the first time.

The present specification proposes a method of dynamically performing resource allocation in consideration of latency of sidelink data/packets and other factors. Accordingly, a data transmission time can be optimized. For example, it is possible to dynamically select a method of contiguously allocating ratio resources for data/packets or a method of non-contiguously allocating the same to optimize a data transmission time. In this procedure, a technique of switching resource allocation methods based on a specific time is proposed. Accordingly, a technical effect of efficiently combining different resource allocation methods is obtained.

BRIEF DESCRIPTION OF THE DRAWINGS

FIG. 8 is a diagram showing an example of a scenario to which sidelink is applied.

DESCRIPTION OF EXEMPLARY EMBODIMENTS

Technical features described below can be used in communication standards according to 3GPP (3rd Generation Partnership Project) standardization organization, communication standards according to IEEE (Institute of Electrical and Electronics Engineers) standardization organization, and the like. For example, communication standards according to 3GPP standardization organization include evolution of LTE (Long Term Evolution) and/or LTE system. Evolution of LTE system includes LTE-A (Advanced), LTE-A Pro and/or 5G NR (New Radio). Communication standards according to IEEE standardization organization include wireless local area network (LAN) systems such as IEEE 802.11a/b/g/b/ac/ax. The aforementioned systems use various multiple access techniques such as orthogonal frequency division multiple access (OFDMA) and/or single carrier-frequency division multiple access (SC-FDMA) for uplink and/or downlink. For example, only OFDMA may be used for downlink, only SC-FDMA may be used for uplink, and OFDMA and SC-FDMA may be used in a combined manner for downlink and/or uplink.

Figure 1:
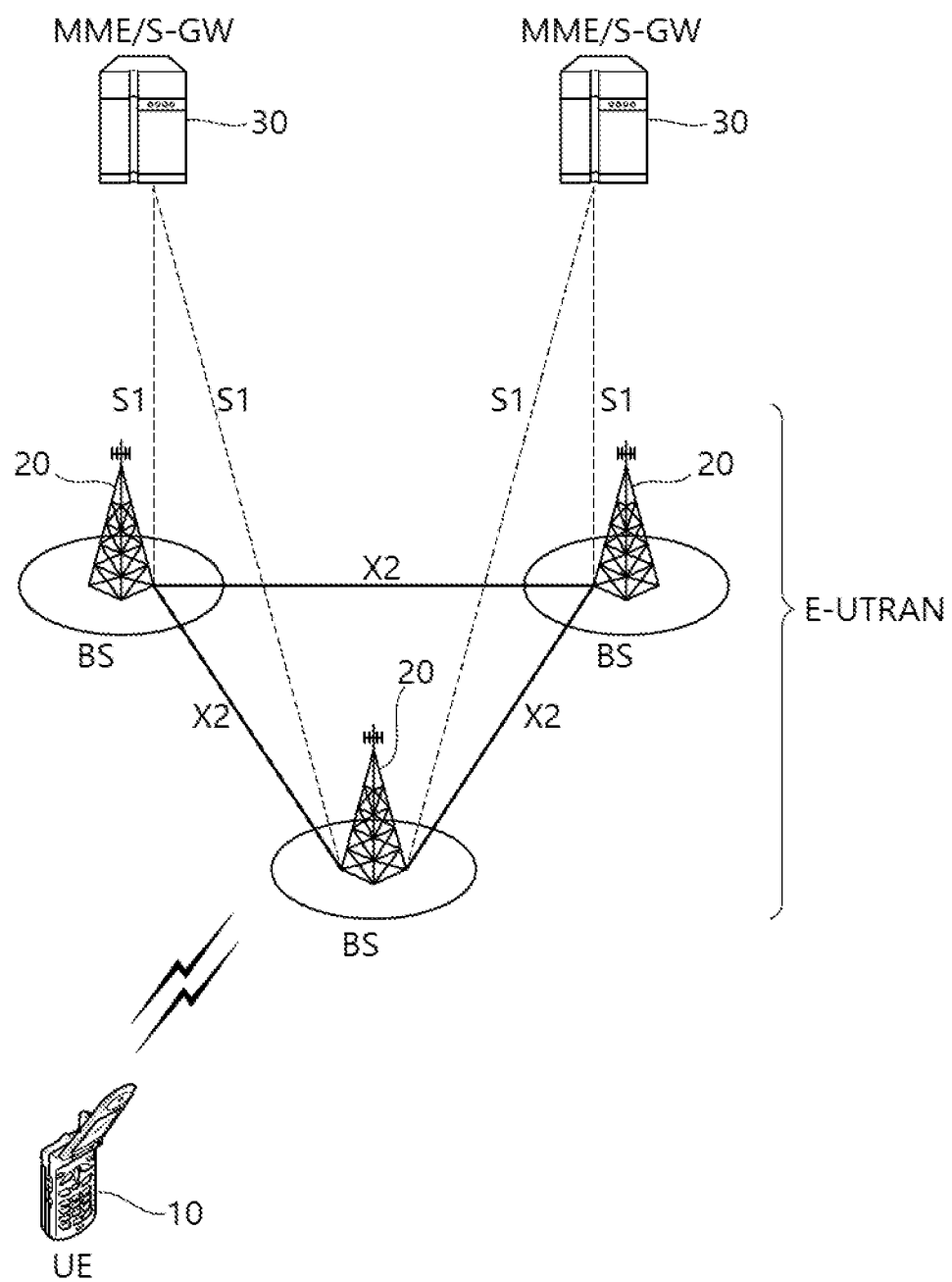
FIG. 1 shows an example of a wireless communication system to which technical features of the present specification are applicable.

FIG. 1 shows an example of a wireless communication system to which technical features of the present specification are applicable. Specifically, FIG. 1 shows an example based on E-UTRAN (Evolved-Universal Terrestrial Radio Access Network). LTE is a part of E-UMTS (Evolved-UMTS) using E-UTRAN (Evolved-Universal Terrestrial Radio Access Network).

E-UTRAN includes a base station (BS) 20 which provides a control plane and a user plane to a user equipment (UE) 10. The UE 10 may be fixed or mobile and also called a mobile station (MS), a user terminal (UT), a subscriber station (SS), a mobile terminal (MT), a wireless device, a station (STA), or the like. The BS 20 refers to a fixed station communicating with the UE 10 and may also be called an evolved-NodeB (eNB), a base transceiver system (BTS), an access point, or the like.

BSs 20 can be connected to each other through an X2 interface. The BS 20 is connected to an evolved packet core (EPC) 30 through an S1 interface, more specifically, to a mobility management entity (MME) through S1-MME and to a serving gateway (S-GW) through S1-U.

The EPC 30 is composed of an MME, an S-GW, and a packet data network gateway (P-GW). The MME has access information of UEs or information related to UE capability, and such information is mainly used for UE mobility management. The S-GW is a gateway having E-UTRAN as an end point and the P-GW is a gateway having PDN as an end point.

Figure 2:
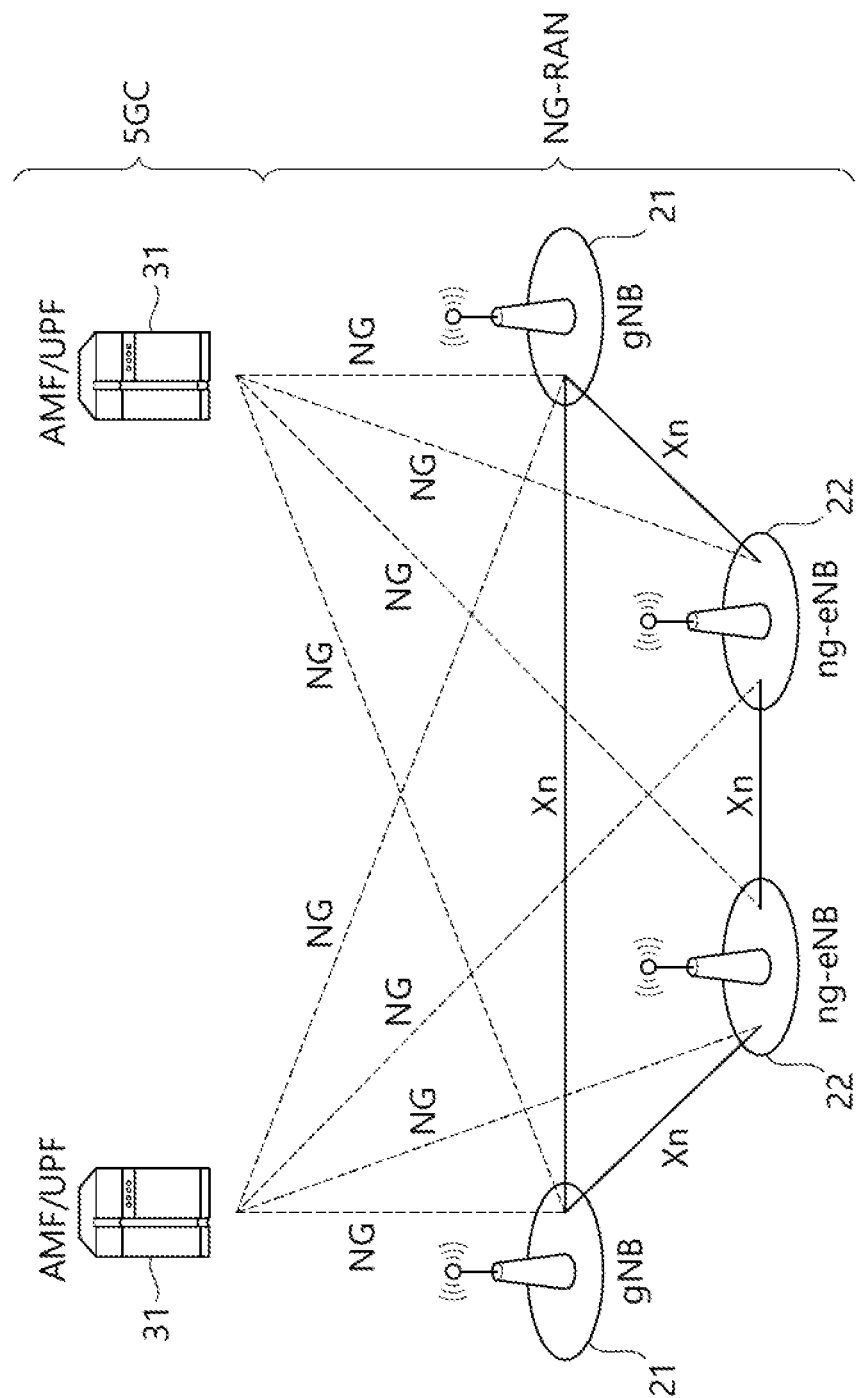
FIG. 2 shows another example of a wireless communication system to which the technical features of the present specification are applicable.

FIG. 2 shows another example of a wireless communication system to which the technical features of the present specification are applicable. Specifically, FIG. 2 shows an example in which 5G NT (New Radio) is used. Communication entities used for 5G NR (hereinafter "NR") adopt some or all functions of the entities (eNB, MME and S-GW) shown in FIG. 1 and may be identified using the name of "NG" or "ng" to be distinguished from the conventional standards.

The system shown in FIG. 2 includes NG-RANs (Radio Access Networks) communicating with UEs and NG-RANs 21 and 22 are entities corresponding to base stations and include a gNB 21 and an ng-eNB 22. A network interface called an Xn interface is defined between the NG-RAN entities 21 and 22. The gNB 21 provides an NR user plane and control plane for UEs and accesses a 5GC (5G Core network) through an NG interface shown in FIG. 2. The ng-eNB 22 is an entity that provides a user plane and a control plane based on UTRA Evolved-Universal Terrestrial Radio Access for UEs and accesses 5GC through the NG interface.

An AMF (Access and Mobility Management Function) is an entity having the conventional MME function and communicates with the NG-RANs 21 and 22 through an NB-C interface. The NG-C interface a control plane interface between NG-RANs and the AMF.

A UPF (User Plane Function) is an entity having the conventional S-GW function and communicates with the NG-RANs 21 and 22 through an NG-U interface. The NG-U interface is a user plane interface between NG-RANs and the AMF.

In the system shown in FIG. 1 and/or FIG. 2, layers of a radio interface protocol between a network (e.g., NG-RAN and/or E-UTRAN) and a UE can be classified as L1 (a first layer), L2 (a second layer) and L3 (a third layer) based on lower three layers of open system interconnection (OSI) reference model widely known in communication system. Among these, a physical layer belonging to the first layer provides an information transfer service using a physical channel and a radio resource control (RRC) layer located in the third layer serves to control radio resources between a UE and a network. To this end, the RRC layer exchanges RRC messages between a UE and a base station.

Hereinafter, a structure of a radio frame transmitted/received through a physical layer will be described.

In LTE (and advanced LTE), a single radio frame includes 10 subframes and a single subframe includes 2 slots. A single subframe is 1 ms in duration and a single slot is 0.5 ms in duration. A time required for a single subframe to be transmitted is called a transmission time interval (TTI). The TTI may be a minimum unit of scheduling.

Distinguished from LTE, NR supports various numerologies and thus various radio frame structures are configured. NR supports a plurality of subcarrier spacings in the frequency domain and an NR numerology is determined by a used numerology. Table 1 below shows a plurality of numerologies supported in NR. Each numerology is identified by an index "µ".

TABLE 1

| M | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

As shown in Table 1, although a subcarrier spacing can be determined as any one of 15, 30, 60, 120 and 240 kHz, a specific numerical value can be changed and thus spacings (e.g., µ=0, 1 . . . 4) can be represented as first to fifth subcarrier spacings (i.e., N subcarrier spacings).

As shown in Table 1, a certain subcarrier spacing may not be used to transmit user data (e.g., a PUSCH (Physical Uplink Shared CHannel), a PDSCH (Physical Downlink Shared CHannel), and the like). That is, user data transmission may not be supported only in at least one predetermined subcarrier spacing (e.g., 240 kHz).

In addition, as shown in FIG. 1, synchronization channels (e.g., a PSS (Primary Synchronization Signal), an SSS (Secondary Synchronization Signal), a PBCH (Physical Broadcast CHannel), and the like) may not be supported in a certain subcarrier spacing. That is, synchronization channels may not be supported in at least one specific subcarrier spacing (e.g., 60 kHz).

In NR, the number of included slots and the number of included symbols may be set depending on various numerologies, that is, various subcarrier spacings. A specific example is shown in Table 2 below.

TABLE 2

| µ | Number of symbols in a slot | Number of slots in a radio frame | Number of slots in a subframe |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

According to Table 2, when a first numerology with "µ=0" is applied, a single radio frame includes 10 subframes, a single subframe corresponds to 1 slot, and a single slot includes 14 symbols. In the present specification, "symbol" refers to a signal transmitted for a specific time interval and may refer to, for example, a signal generated according to OFDM (Orthogonal Frequency Division Multiplexing) processing. That is, a symbol in the present specification may refer to an OFDM/OFDMA symbol, an SC-FDMA symbol, or the like. A cyclic prefix (CP) may be positioned between symbols.

The example shown in Table 2 may be an example to which a normal cyclic prefix (CP) is applied.

Figure 3:
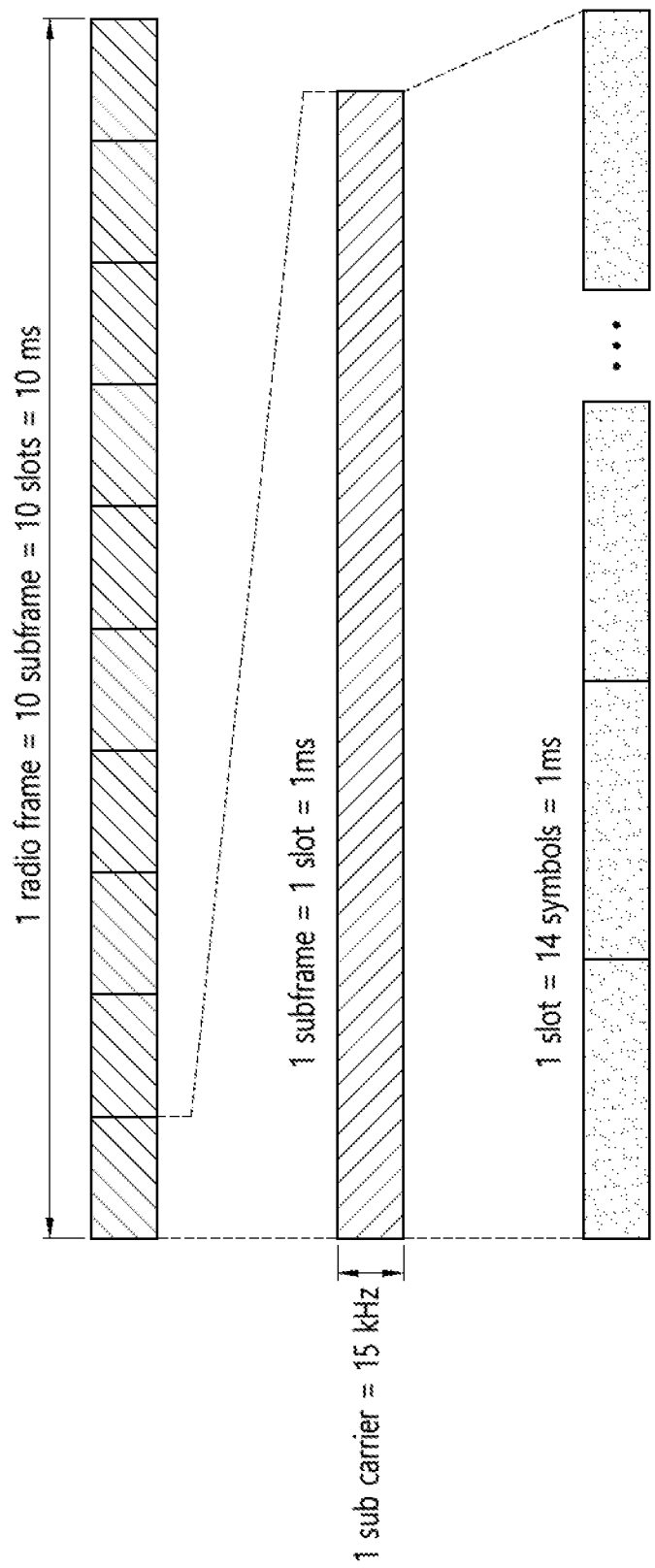
FIG. 3 shows an example to which a specific numerology is applied.

FIG. 3 shows an example to which a specific numerology is applied. That is, FIG. 3 shows a case in which µ=0.

Figure 4:
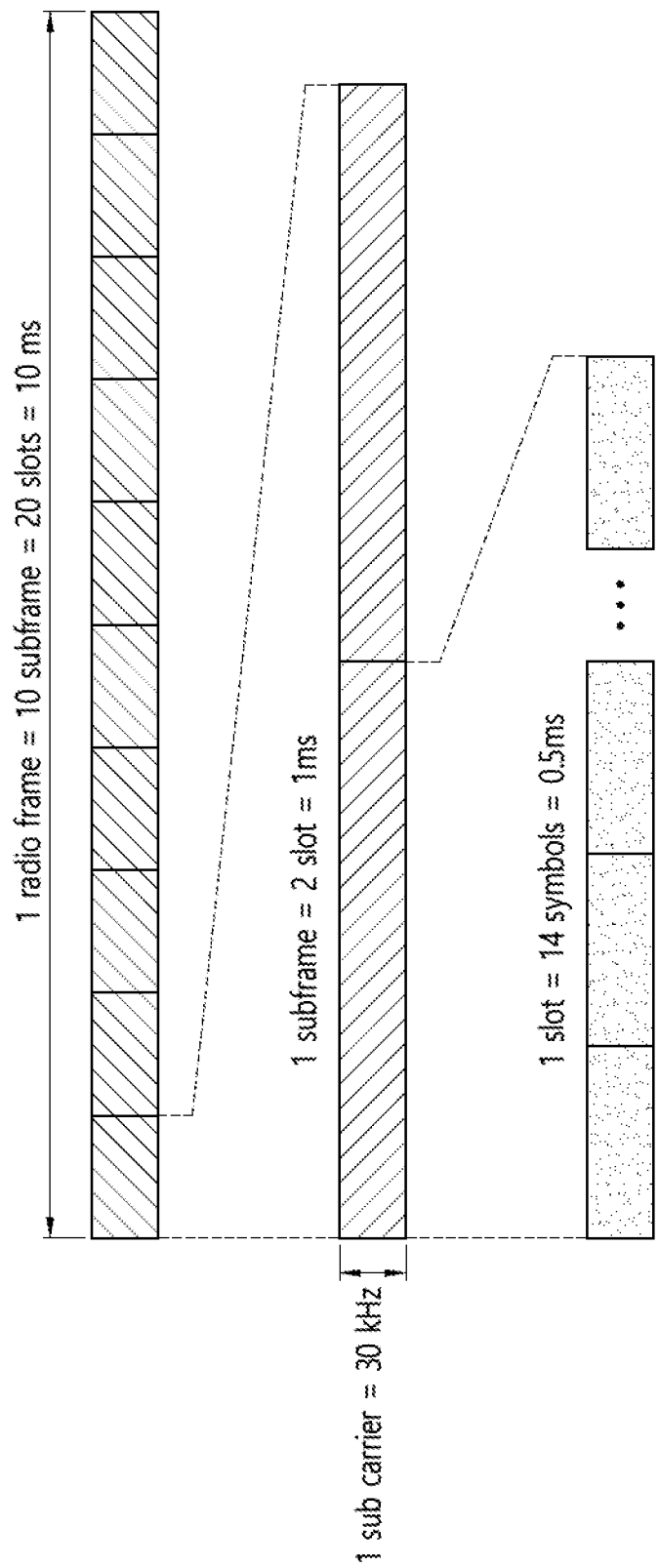
FIG. 4 shows an example to which another numerology is applied.

FIG. 4 shows an example to which another numerology is applied. That is, FIG. 4 shows a case in which µ=1.

Meanwhile, FDD (Frequency Division Duplex) and/or TDD (Time Division Duplex) may be applied to a wireless system to which an example of the present specification is applied. When TDD is applied, uplink and downlink subframes are allocated in units of subframe in LTE.

In the case of NR standard/system, classification into downlink (D), flexible (X) and uplink (U) may be performed in units of symbol as shown in the following table. The content of the table can be commonly applied to a specific cell, commonly applied to neighboring cells or individually or separately applied to respective UEs.

TABLE 3

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |

For convenience of description, Table 3 shows only a part of formats (i.e., TDD formats) actually defined in NR and a specific allocation technique may be changed or added.

For a UE, a slot format (i.e., TDD format) may be configured through higher layer signaling, configured through downlink control information (DCI) transmitted through a physical downlink control channel (PDCCU), or configured based on a combination of higher layer signaling (i.e., RRC signaling) and DCI.

Figure 5:
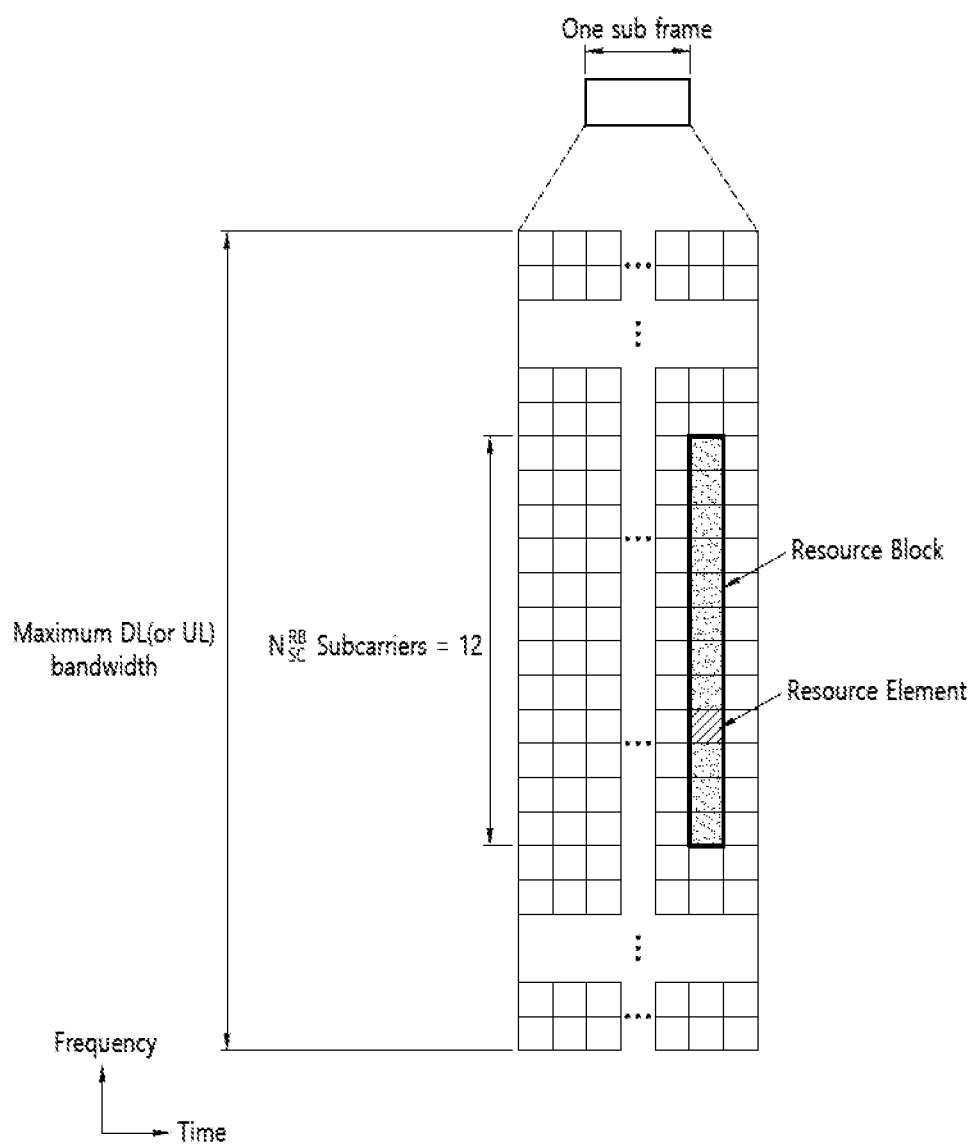
FIG. 5 is a diagram showing an example of a resource grid.

FIG. 5 is a diagram showing an example of a resource grid. The example of FIG. 5 shows a time-frequency resource grid used in NR. The example of FIG. 5 may be applied to uplink and/or downlink. As shown, a single subframe includes a plurality of slots in the time domain. Specifically, "14×2$^µ$" symbols can be represented in a resource grid. Further, a single resource block (RB) can occupy contiguous 12 subcarriers, as shown. A single resource block may be called a physical resource block (PRB) and each physical RB may include 12 resource elements (REs). The number of RBs that can be allocated may be determined based on a minimum value and a maximum value. Further, the number of RBs that scan be allocated may be individually set according to numerology ("µ") and may be set as the same value or different values for uplink and downlink.

Hereinafter, a cell search method performed in NR will be described. A UE may perform cell search for acquisition of time and/or frequency synchronization and acquisition of a cell ID. For cell search, synchronization channels such as a primary synchronization signal (PSS), a secondary synchronization signal (SSS), and a physical broadcast channel (PBCH) are used.

Figure 6:
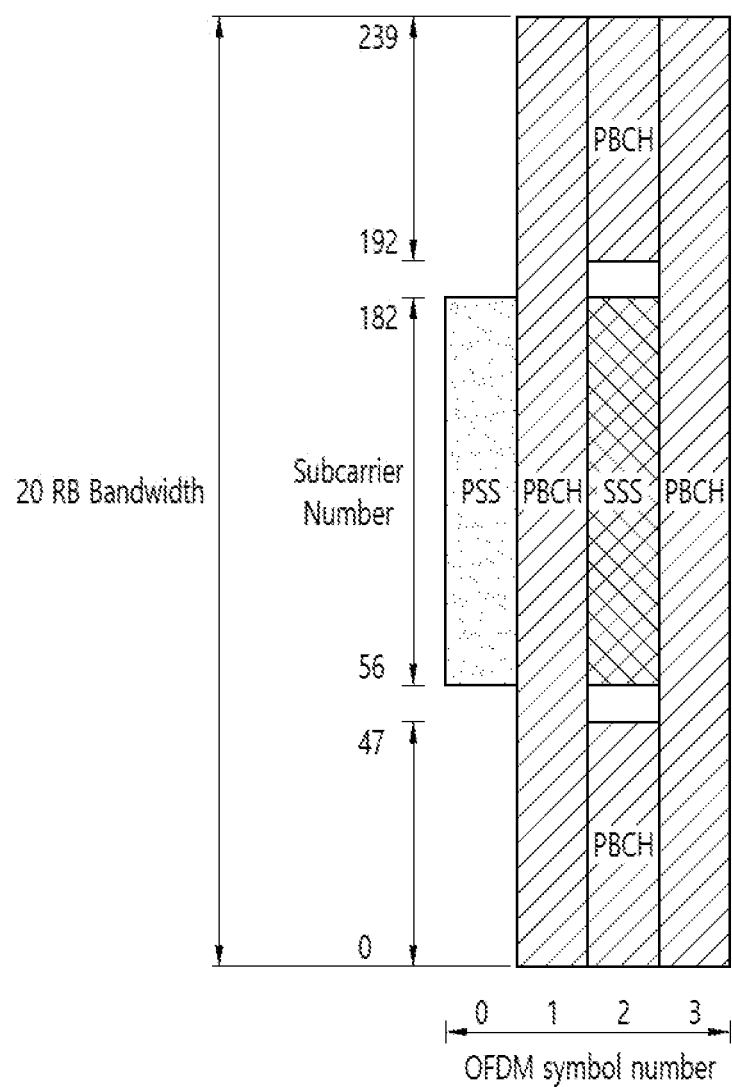
FIG. 6 shows an example of synchronization channels to which an example of the present specification is applied.

FIG. 6 shows an example of synchronization channels applied to an example of the present specification. As shown, a PSS and an SSS may include 1 symbol and 127 subcarriers and a PBCH may be transmitted through 3 symbols and may include 240 subcarriers.

The PSS is used for synchronization signal/PBCH block (SSB) symbol timing acquisition and indicates three hypotheses for cell ID identification. The SSS is used for cell ID identification and indicates 336 hypotheses. Consequently, 1,008 physical layer cell IDs can be configured through the PSS and the SSS.

An SSB can be repeatedly transmitted according to a preset pattern in a 5 ms window. For example, when L SSBs are transmitted, SSB #1 to SSB #L can be transmitted through beams in different directions although they include the same information. That is, quasi co-location (QCL) may not be applied to SSBs in a 5 ms window. Beams used to receive SSBs may be used in a subsequent operation (e.g., a random access operation) between a UE and a network. SSBs may be repeated at specific intervals. A repetition interval may be individually determined according to numerology.

As shown, the PBCH has a bandwidth of 20 RBs in the second/fourth symbol and a bandwidth of 8 RBs in the third symbol. The PBCH includes a DM-RS for PBCH decoding. A frequency region of the DM-RS is determined according to cell ID. Distinguished from LTE, a cell-specific RS (CRS) is not defined in NR and thus a specific DM-RS is defined for PBCH decoding. A PBCH-DMRS may include information indicating an SBS index.

The PBCH executes various functions including a function of broadcasting a master information block (MIB) as a representative function. For reference, system information (SI) is divided into minimum SI (MSI) and other SI (OSI), the minimum SI may be divided into an MIB and SIB1, and minimum SI other than the MIB may be called remaining minimum SI (RMSI).

The MIB includes information necessary to decode system information type 1 (SIB1). For example, the MIB includes a subcarrier spacing applied to SIB1 (and message 2/4 used in a random access procedure and other system information (SI)), a frequency offset between an SSB and an RB transmitted thereafter, a bandwidth of a PDCCH/SIB, and information for PDCCH decoding (e.g., information related to search-space/CORESET/DM-RS). The MIB can be periodically transmitted and the same information can be repeatedly transmitted in a time interval of 80 ms. The SIB1 can be repeatedly transmitted through a PDSCH and includes control information for initial access of a UE and information for decoding of other SIBs.

Hereinafter, sidelink or D2D operation to which an example of the present specification is applied will be described.

Figure 7:
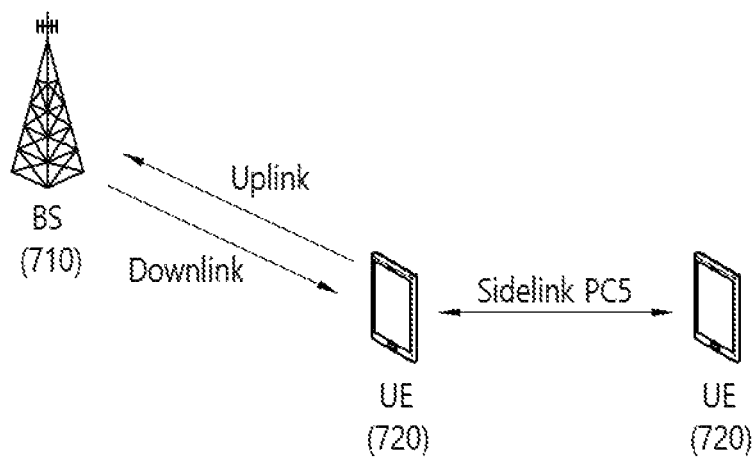
FIG. 7 is a diagram showing a structure of sidelink to which an example of the present specification is applied.

FIG. 7 is a diagram showing a sidelink structure to which an example of the present specification is applied. As shown, uplink (UL) and downlink (DL) can be defined between a base station 710 and a UE 720. Further, sidelink (SL) is defined between UEs 720 and the SL corresponds to a PC5 interface defined in 3GPP. For example, resources allocated to SL can be selected from UL resources. Specifically, subframes (or time resources such as slots) on a UL frequency in FDD or subframes (or time resources such as slots) allocated to UL in TDD can be allocated.

The term "ProSe communication" can be used as a similar concept to the SL. ProSe refers to an end-to-end application whereas the SL may refer to a channel structure. Specifically, structures of physical/transport/logical channels used for an air-interface for realizing the ProSe application are generally described as the concept of the SL.

FIG. 8 is a diagram showing an example of a scenario to which SL is applied. As shown, the SL or ProSe communication can be classified into three scenarios. First, in an in-coverage scenario, a network (e.g., base station) can allocate specific resources for sidelink (or ProSe) to a transmission UE or allocate a resource pool (RP) that can be used by the transmission UE. Second, an out-of-coverage scenario is a case in which control by a network is impossible. The transmission UE can perform SL communication through preset resources (e.g., resources preset through SIM, UICC, and the like). Even in the out-of-coverage scenario, general cellular traffic may be in an in-coverage situation and coverage may not be present only for ProSe communication. Lastly, in a partial coverage scenario, an in-coverage UE and an out-of-coverage UE coexist. Specifically, the out-of-coverage UE may use preset resources whereas the in-coverage UE may perform communication through resources controlled by a network.

Figure 9:
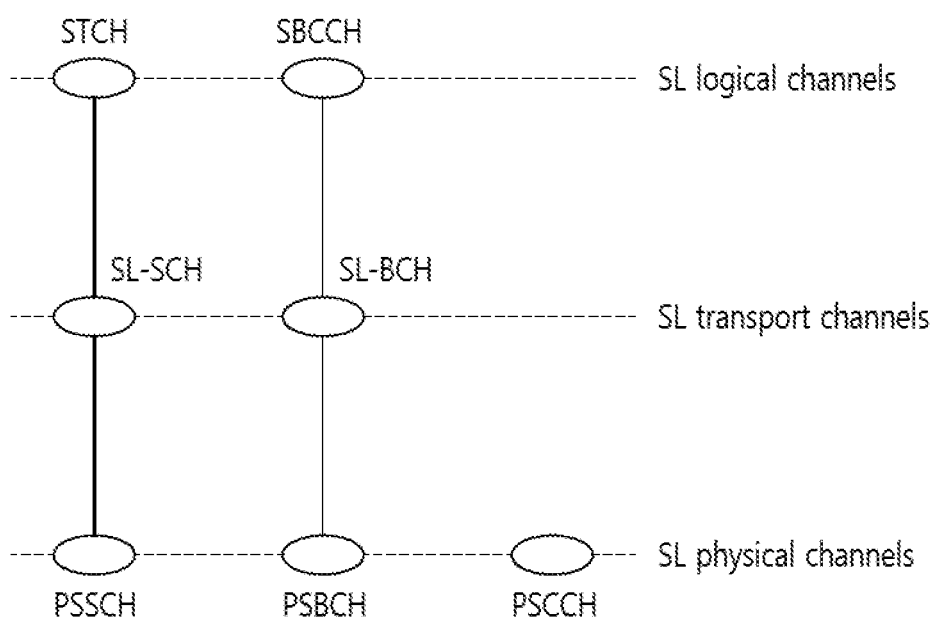
FIG. 9 is a diagram showing a mapping relationship between channels related to sidelink.

FIG. 9 is a diagram showing a mapping relationship between channels related to sidelink. An SL traffic channel (STCH) for a data path and an SL broadcast control channel (SBCCH) for control signaling can be defined as logical channels for SL. The STCH is used to transmit user information for the ProSe application and mapped to an SL shared channel (SL-SHC) and a physical SL shared channel (PSSCH). The SBCCH is used to transmit a control signal for synchronization, and the like and mapped to an SL broadcast channel (SL-BCH) and a physical SL broadcast channel (PSBCH). The PSCCH corresponds to a PDCCH of cellular communication. Specifically, the PSCCH is used to transmit sidelink control information (SCI) that is control information necessary to receive and demodulate the PSSCH, and the SCI is transmitted before an STCH data block is transmitted.

Figure 10:
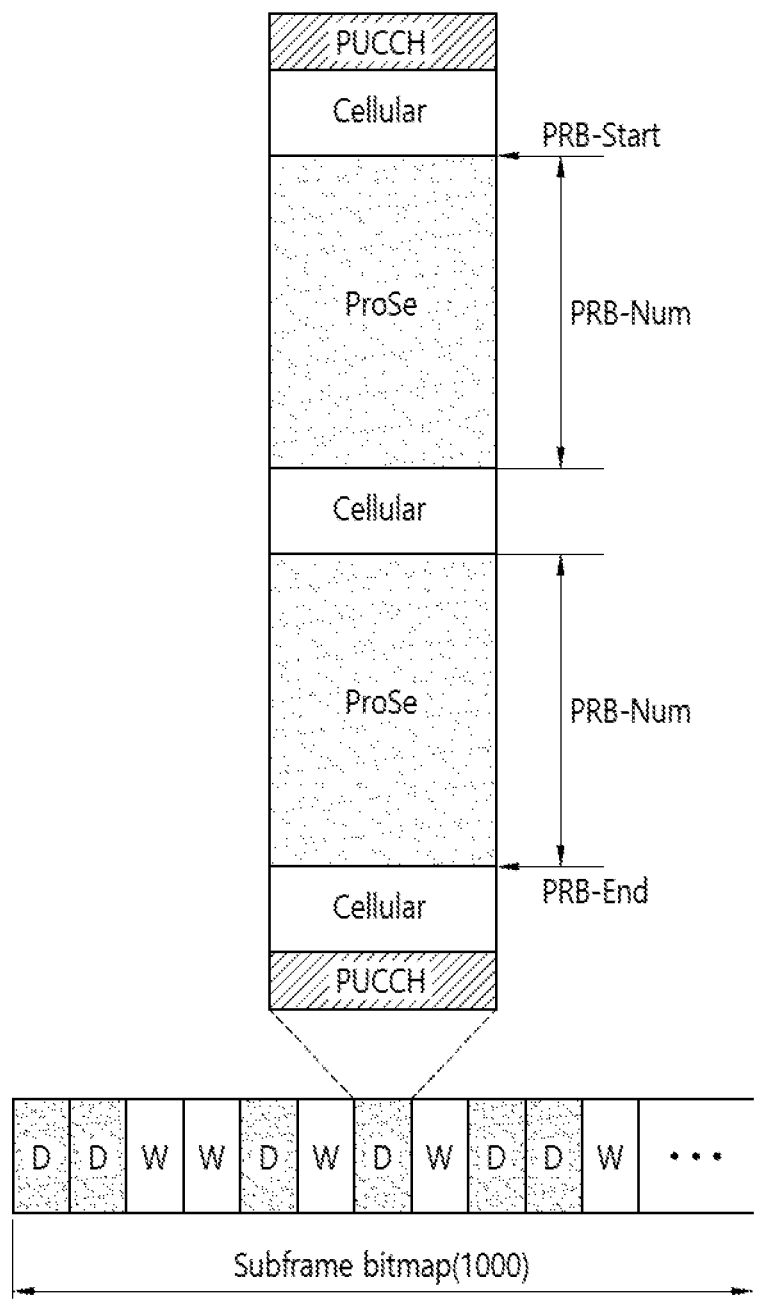
FIG. 10 shows an example of a resource pool for sidelink (SL) communication.

FIG. 10 shows an example of a resource pool for SL communication. FIG. 10 shows an example in which a resource pool is configured in units of subframe. However, shown subframes may be replaced with other time units (e.g., slots, symbols, or TTI). According to the example of FIG. 10, it can be indicated whether a corresponding subframe is used for SL according to a subframe bitmap 1000. A pattern displayed according to the subframe bitmap 1000 can be repeated.

According to the example of FIG. 10, two frequency resources can be allocated for SL within a single subframe and each frequency resource can be represented in units of physical resource block (PRB). Specifically, one frequency resource may start at PRB start, the other may end at PRB end, and each frequency resource may occupy RPBs corresponding to PRB-Num. One UE may be configured to use only one of a resource for SL/ProSe communication and a resource for cellular communication. Resource pools (RPs) for SL communication may be divided into an RP for reception (Rx RP) and an RP for transmission (Tx RP), and each RP can be signaled by a base station. All Tx RPs can be connected to at least one Rx RP.

RP allocation methods can be divided into Mode 1 and Mode 2. A base station can indicate a resource in a specific RP in Mode 1 and a UE can select a specific RP and select a resource from an allocated RP set in Mode 2. A UE needs to be RRC-connected for Mode 1 but Mode 2 may operate even in an RRC idle state or an out-of-coverage state. This will be described in more detail with reference to FIG. 11.

Figure 11:
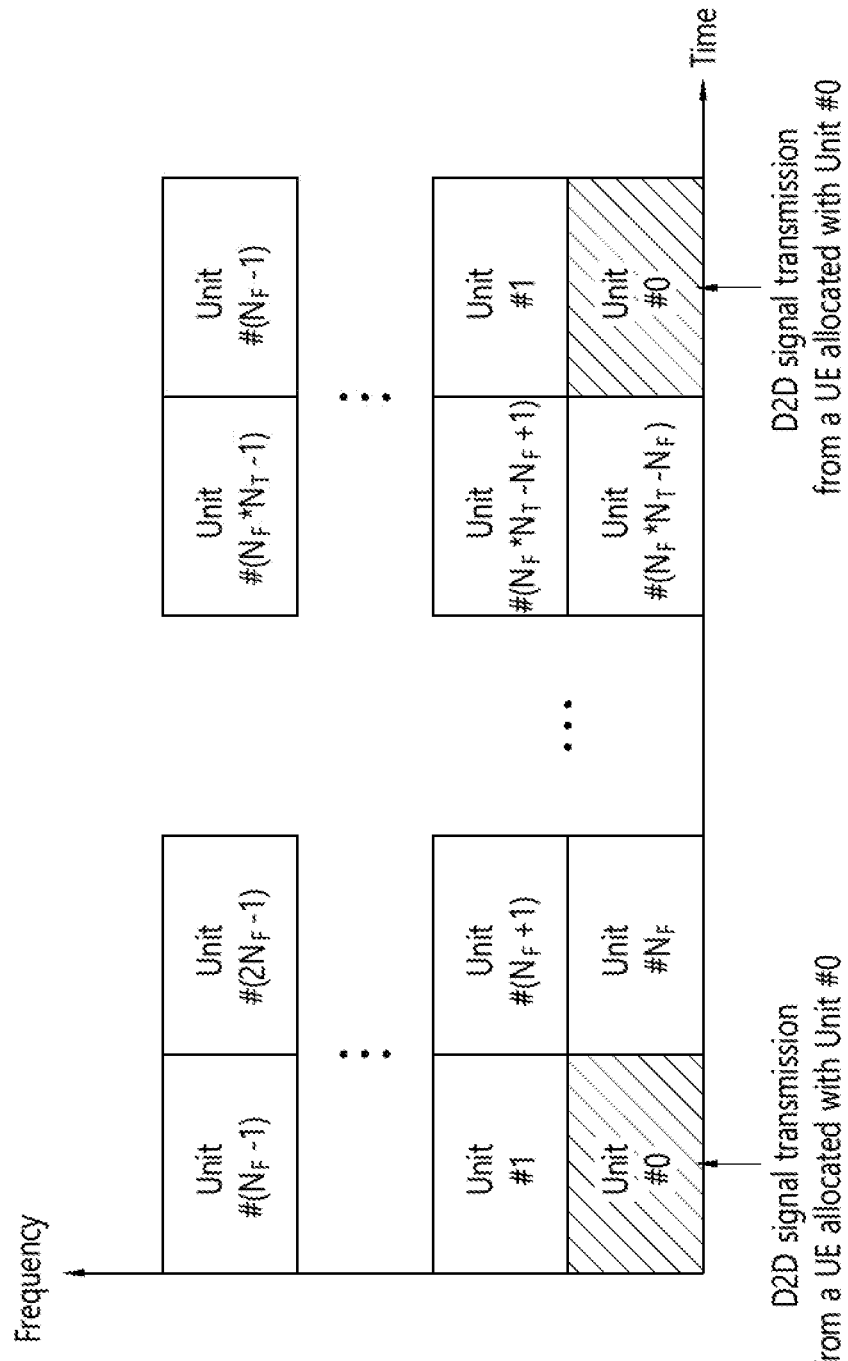
FIG. 11 shows another example of a resource pool for sidelink (SL) communication.

FIG. 11 shows another example of a resource pool for SL communication. The example of FIG. 11 can be used by UE1 (i.e., a transmission UE) and UE2 (i.e., a reception UE) which can communicate with each other through SL. Further, when network equipment such as an eNB transmits/receives signals according to a communication scheme between UEs, the network equipment can be regarded as a kind of UE.

In the following description, UE1 (transmission UE) can operate to select a resource unit corresponding to a specific resource in an RP and to transmit a sidelink/D2D signal using the resource unit. An RP in which UE1 can transmit a signal is configured for UE2 (reception UE) and UE2 detects a signal of UE1 within the RP. The RP may be signaled by a base station when UE1 is within a range in which UE1 is connected to the base station (i.e., in-coverage case) or may be signaled by another UE or determined as predetermined resources when UE1 is out of the range in which UE1 is connected to the base station (i.e., partial coverage or out-of-coverage case). In general, an RP is composed of a plurality of resource units and each UE can select one or a plurality of resource units and transmit a sidelink/D2D signal thereof using the same.

FIG. 11 shows an example of resource units. All frequency resources are divided into N_F resource units and all time resources are divided into N_T resource units to define a total of N_F*N_T resource units. In other words, the resource pool (RP) of FIG. 11 can be regarded as being repeated at an interval of N_T subframes (or in other time units). That is, one resource unit can be periodically repeated as shown in FIG. 11. Alternatively, to obtain diversity effect in time and/or frequency dimensions, an index of a physical resource unit to which a single logical resource unit is mapped may change with time based on a predetermined pattern. In this situation, an RP for sidelink/D2D communication may refer to a set of resource units that can be used for a UE (i.e., transmission UE) that intends to transmit a sidelink/D2D signal to transmit the sidelink/D2D signal.

The above-described RPs can be subdivided into various types. First, RPs can be divided into various types according to content of sidelink/D2D signals transmitted in the RPs. For example, content of D2D signals can be classified as follows and separate RPs (i.e., individual or different RPs) can be set therefor.

Content example #1: Scheduling assignment (SA) or sidelink/D2D control channel

The control channel described here is used by each transmission UE for a signal including a resource position of a sidelink/D2D data channel subsequently transmitted or transmitted in the same time unit (e.g., a subframe, a TTI, a slot, or a symbol) and control information necessary to demodulate the data channel (e.g., at least one of information elements such as an MCS, a MIMO transmission scheme, and timing advance). The aforementioned signal may be multiplexed with sidelink/D2D data and transmitted on the same resource unit. In this case, an SA resource pool refers to a pool for resources in which SA is multiplexed with sidelink/D2D data and transmitted. An SA control channel may also be called a sidelink/D2D control channel. SA may correspond to the PSCCH described in FIG. 9.

Content example #2: sidelink/D2D data channel

An individual RP may be allocated to a sidelink/D2D data channel on which a transmission UE transmits user data using a designated resource through scheduling assignment (SA). The sidelink/D2D data channel may correspond to the PSSCH described in FIG. 9. If the sidelink/D2D data channel can be multiplexed with sidelink/D2D data and transmitted on the same resource unit, only the sidelink/D2D data channel other than SA information is transmitted in an RP for the sidelink/D2D data channel. In other words, resource elements that have been used to transmit SA information in an individual resource unit in an SA RP are still used to transmit sidelink/D2D data in a sidelink/D2D data channel RP.

Content example #3: discovery channel

A message by which a transmission UE transmits information such as the ID thereof such that a neighboring UE discovers the transmission UE is transmitted through a discovery channel or a physical sidelink discovery channel (PSDCH). An individual RP can be allocated to the corresponding channel.

Even when D2D signals have the same content, different resource pools can be used according to transmission/reception attributes of the D2D signals. For example, even for the same sidelink/D2D data channel or discovery message, resource pools can be divided into different resource pools according to a D2D signal transmission timing determination method (e.g., whether a D2D signal is transmitted at a reference signal reception timing or at a timing after a predetermined timing advance therefrom), a resource allocation method (e.g., whether an individual signal transmission resource is designated by a base station for an individual transmission UE or an individual transmission UE selects an individual signal transmission resource in a pool), a signal format (e.g., the number of symbols occupied by each D2D signal in one subframe or the number of subframes used to transmit one D2D signal), the intensity of a signal from a base station, a transmission power intensity of a D2D UE, and the like. As described above, a method by which a base station directly indicates a transmission resource of a transmission UE in sidelink/D2D communication may be referred to as Mode 1 and a method by which a transmission resource region is preset or the base station designates the transmission resource region and the transmission UE directly selects a transmission resource may be referred to as Mode 2. In the case of D2D discovery, a case in which a base station directly indicates a resource may be referred to as Type 2 and a case in which a UE directly selects a transmission resource in a preset resource region or a resource region indicated by the base station may be referred to as Type 1.

Data transmission technique for sidelink (SL)

Figure 12:
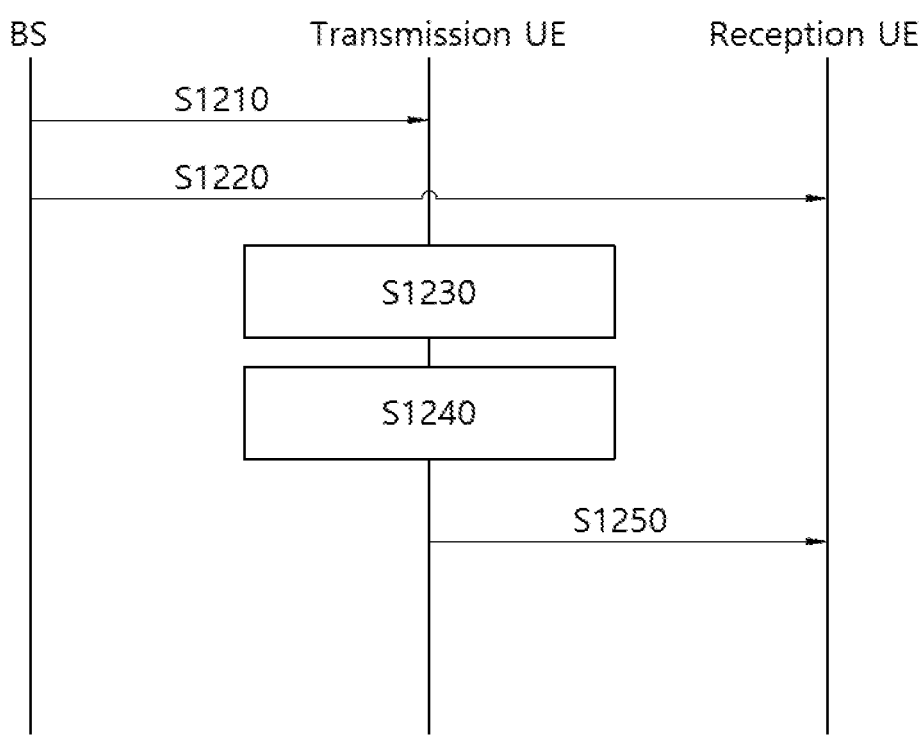
FIG. 12 is a diagram showing a method by which a transmission UE starts data transmission through sidelink (SL) according to an embodiment of the present specification.

FIG. 12 is a diagram showing a method by which a transmission UE starts data transmission through sidelink according to an example of the present embodiment. A base station can allocate the aforementioned resource pool (RP) to UEs (transmission/reception UEs) through steps S1210 and S1220. The resource pool may be configured as the example shown in FIGS. 9 to 11. The order of steps S1210 and S1220 and a subject that performs the steps may be changed. For example, the reception UE may receive information related to the resource pool through the transmission UE or the transmission UE may receive the information related to the resource pool through the reception UE. The order of the two steps may be changed and the two steps may be performed through one step. Step S1210 and/or step S1220 of FIG. 12 may be represented as a step of acquiring (or checking or specifying) radio resources to be allocated for sidelink. That is, the resource pool may be represented as a "radio resource", a "radio resource allocated for sidelink", or the like. A radio resource may include at least one subchannel and at least one time unit. A subchannel may be composed of one or a plurality of contiguous resource blocks (RBs) or a specific number of contiguous subcarriers.

A time unit may be a subframe, a transmission time interval (TTI), a slot, an OFDM/OFDMA symbol, or an SC-FDM/SC-FDMA symbol.

In step S1230 of FIG. 12, the transmission UE may generate data (or a packet described below) to be transmitted through the radio resources. Step S1230 may include a process through which data generated in a higher layer is transmitted to a lower layer (e.g., physical layer). Further, step S1230 may include a process through which sidelink/V2X/D2D data arrives at a specific layer (e.g., physical layer). The transmission UE may check/determine/acquire a data/packet arrival time tin step S1230.

In step S1240 of FIG. 12, the transmission UE specifies radio resources for transmitting the data generated in step S1230. The resources specified in step S1240 may be determined/specified through a method of dynamically selecting contiguous allocation and non-contiguous allocation which will be described below. That is, as will be described below, sidelink communication may be performed through a plurality of contiguous subchannels or non-contiguous subchannels according to specific conditions. In this process, the transmission UE may determine whether a plurality of subchannels is allocated to a radio resource before a first time (e.g., a time t+X described below) from among radio resources. According to such determination, a time at which data is transmitted through sidelink can be determined.

In step S1250 of FIG. 12, the transmission UE transmits data/packets to the reception UE through sidelink. A radio resource used for transmission is specified/determined in step S1240.

Radio resources (e.g., RBs) used in sidelink/D2D/V2X communication may be contiguously or non-contiguously present. That is, radio resources (e.g., RBs) that can be transmitted according to a surrounding environment of a sidelink/D2D/V2X UE may be contiguously or non-contiguously present. Alternatively, the radio resources may be contiguously present and then non-contiguously present or non-contiguously present and then contiguously present. In this case, the transmission UE can use contiguous allocation or non-contiguous allocation in order transmit the data/packets. Alternatively, the transmission UE may dynamically select contiguous allocation and non-contiguous allocation. Contiguous allocation and non-contiguous allocation will be additionally described below.

Contiguous Allocation

Contiguous allocation refers to a method of performing sidelink communication through contiguous frequency and/or time resources. When there is a small number of transmission UEs which intend to transmit sidelink data/packets in one cell, the transmission UEs can use contiguous frequency resources (e.g., contiguous RBs). In this case, contiguous allocation that can reduce inband emission can be used. When a transmission UE that is transmitting packets can continuously use contiguous RBs, SC-FDM/SC-FDMA that is advantageous in terms of a peak-to-average power ratio (PAPR) may be used as a modulation scheme. That is, it is desirable to use SC-FDM/SC-FDMA when contiguous allocation is used.

Non-Contiguous Allocation

When there is a large number of transmission UEs which intend to transmit data/packets transmitted through sidelink in one cell or a transmission UE needs to aperiodically/periodically transmit a small amount of data/packets, it may be difficult for the transmission UE to use contiguous frequency resources (e.g., contiguous RBs). In this case, the transmission UE may use non-contiguous allocation. When a transmission UE that is transmitting data/packets has difficulty using contiguous RBs, OFDM (e.g., cyclic-prefix OFDM (CP-OFDM)) that allows flexible transmission in terms of frequency may be used as a modulation scheme. That is, it is desirable to use OFDM(A) instead of SC-FDM(A) when non-contiguous allocation is used.

However, when contiguous/non-contiguous allocation is selected, it is advantageous to dynamically select contiguous/non-contiguous allocation rather than selecting it in a fixed manner. That is, contiguous allocation can be preferentially used when frequency resources (e.g., RB resources) that can be transmitted by a transmission UE are contiguous. However, when the number of transmission UEs that intend to transmit data/packets in one cell continuously changes and thus it is difficult to use contiguous RB resources or a transmission UE needs to transmit data/packets with short latency, it is desirable that resource allocation be dynamically changed.

Figure 13:
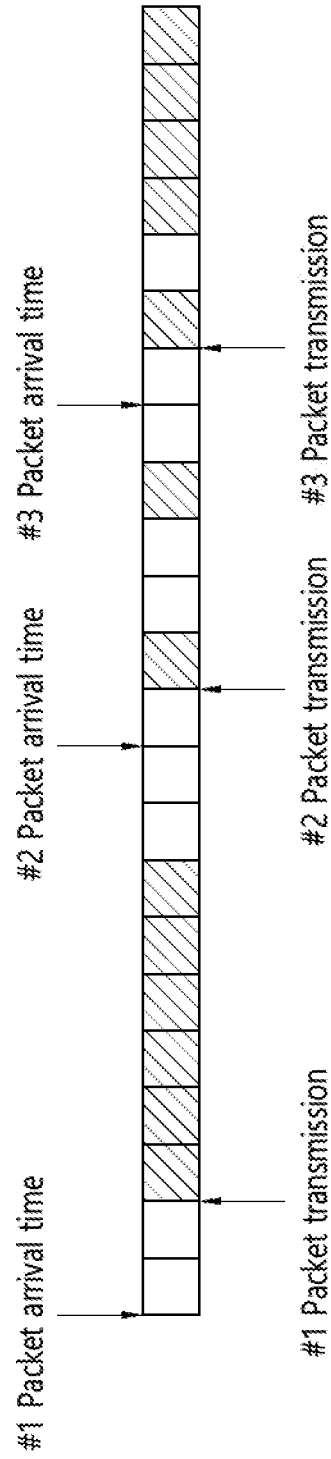
FIG. 13 shows an example of operation allocation applied to the present specification.

FIG. 13 shows an example of operation allocation applied to the present specification. In the figures below, one block may include the aforementioned radio resource or resource pool. That is, one block can include at least one subchannel and at least one time unit. In this case, a subchannel may be composed of a plurality of contiguous resource blocks or a specific number of contiguous subcarriers. One time unit may be various units such as a subframe, a TTI, a slot, an OFDM/OFDMA symbol, and an SC-FDM/SC-FDMA symbol.

In figures below, a block represented by slanted lines represents that a radio resource or a resource pool has been allocated to a corresponding transmission UE and a block represented by dots represents that a resource has been transmitted using an allocated resource. Further, a blank block represents that no resource is allocated to a transmission UE. In the figures of the present specification, the horizontal axis represents time and the vertical axis represents frequency unless otherwise mentioned.

FIG. 13 shows an example in which contiguous allocation is used for packet #1 and non-contiguous allocation is used for packets #2 and #3. Referring to FIG. 12, the transmission UE may acquire information related to radio resources allocated for sidelink through step S1210 and then confirm/determine/check that blocks represented by slanted lines in FIG. 13 have been allocated. Then, data (e.g., packets #1/#2/#3) is generated in step S1230 and radio resources for the data are allocated/determined in step S1240.

Figure 14:
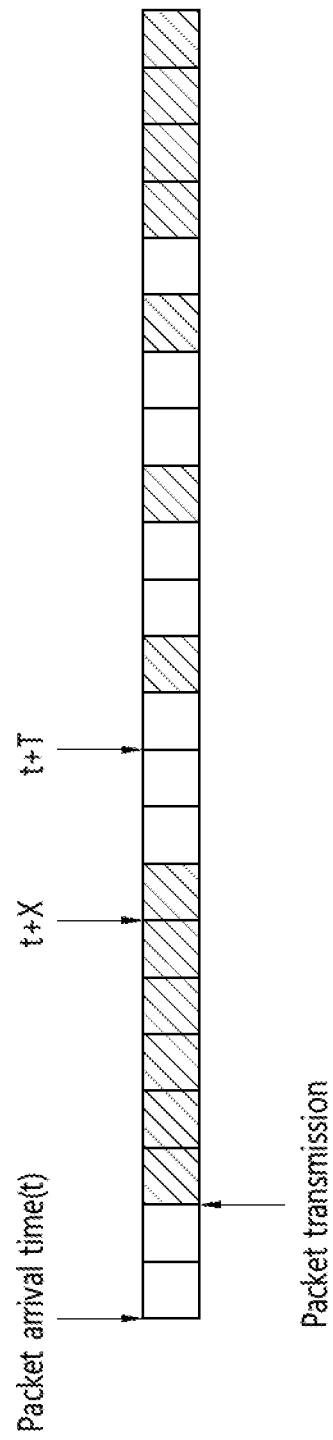
FIG. 14 shows an example in which an allocation method is determined in consideration of delay of transmission data.
Figure 15:
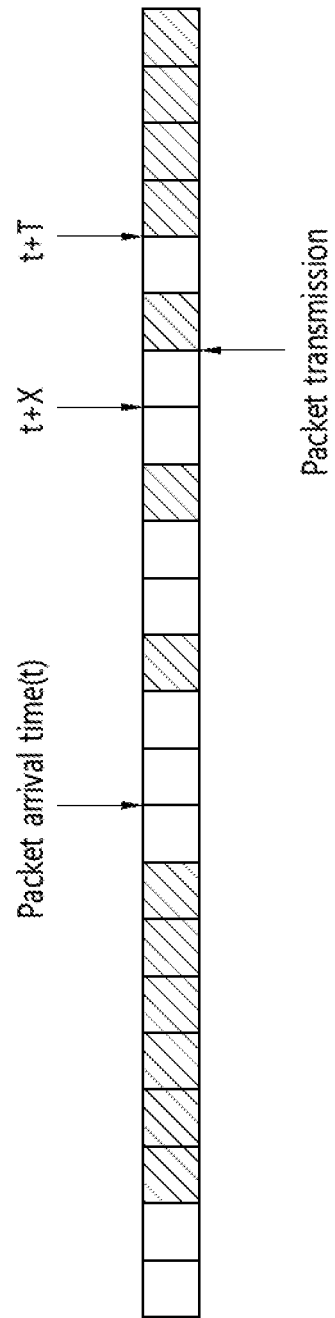
FIG. 15 shows an example in which sidelink (SL) communication is performed when contiguous resources are not present for a specific time.

Radio resource allocation patterns in FIGS. 14 and 15 are the same as that of FIG. 13.

FIG. 14 shows an example in which an allocation scheme is determined in consideration of transmission data delay. For example, transmission data/packets may be transmitted with low latency. In this case, non-contiguous allocation can be used irrespective of continuity of frequency resources whenever an available frequency resource (e.g., RB resource) is generated. On the other hand, when low latency is not forced, that is, latency has a margin, data can be transmitted through available contiguous resources after waiting for presence of contiguous frequency resources (e.g., RB resources) that can be contiguously allocated.

Referring to FIG. 14, data/packets transmitted through sidelink arrive at a time t, and it can be determined that the data/packets need to be transmitted before a time t+T in consideration of latency thereof. In this case, the data/packets need to be transmitted before a time t+X(X<T) in consideration of signal processing time, and the transmission UE can determine whether contiguous resources are generated/present before the time t+X.

When contiguous resources are generated for a time X that is a threshold value, sidelink communication is performed using the contiguous resources. In this case, it is desirable to use SC-FDM(A) as a modulation scheme. Here, when another transmission UE transmits data/packets, the UE may perform backoff or random access in order to avoid collision with other transmission UEs.

Here, it is necessary to prepare for a case in which contiguous radio resources (e.g., RB resources) are not present for the time X and thus data/packets cannot be transmitted. Accordingly, when contiguous resources are not present for the time X that is the threshold value, if resources that can be transmitted are present after t+X, the data/packets are transmitted using the resources. In this case, it is desirable to use OFDM(A) as a modulation scheme.

FIG. 15 shows an example in which sidelink communication is performed when contiguous resources are not present for a predetermined time. As shown, sidelink communication start time is determined in consideration of whether contiguous resources are allocated before t+X. As shown, since contiguous resources are not present for a time between t and t+X, a transmission UE does not start sidelink communication. The transmission UE starts sidelink communication if available resources are present irrespective of whether the resources are contiguous after t+X.

The aforementioned attribute can be determined based on ProSe priority per packet (PPPP) preset in the network. PPPP is a value indicating data/packet priority for sidelink, and it is possible to determine whether contiguous allocation and SC-FDM(A) will be applied or non-contiguous allocation and OFDM(A) will be applied according to PPPP. For example, an operation of comparing PPPP with a preset threshold value (e.g., set through higher layer signaling or physical layer signaling) may be added. When data/packet that requires high PPPP is transmitted, contiguous allocation can be used. In this case, SC-FDM(A) may be used as a modulation scheme. Further, factors other than PPPP may be considered. For example, contiguous allocation or non-contiguous allocation may be used based on a preset target coverage. For example, in the case of data/packet targeting for a coverage farther than the preset threshold value (e.g., set through higher layer signaling or physical layer signaling), contiguous allocation can be used. In this case, SC-FDM(A) may be used as a modulation scheme.

The above-described examples may be additionally modified as shown in FIGS. 16 to 20.

In examples below, embodiments will be described based on a subchannel for convenience of description. A subchannel is the concept related to the aforementioned resource unit, and each subchannel is composed of one or a plurality of contiguous RBs or a specific number of contiguous subcarriers, as described above. Each subchannel may be transmitted in specific time units and time units may be various units such as a subframe, a transmission time interval (TTI), a slot, an OFDM/OFDMA symbol, and an SC-FDM/SC-FDMA symbol, as described above.

Figure 16:
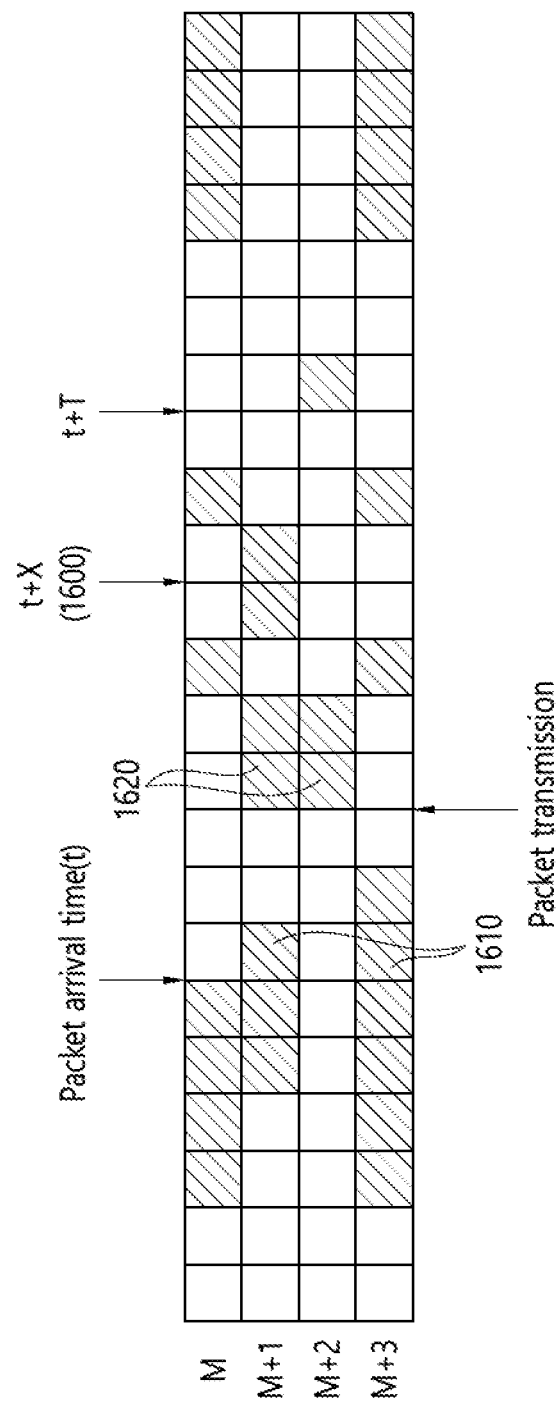
FIG. 16 shows an example of performing sidelink (SL) communication based on four subchannels.

FIG. 16 shows an example in which sidelink communication is performed based on subchannels. A resource allocation scheme shown in FIG. 16 is a scheme of waiting for contiguous subchannels that can be contiguously allocated, and when available contiguous resources are generated, transmitting data/packets. Specifically, it may be determined that data/packets for sidelink have arrived at a time t and it needs to be transmitted before a time t+T based on latency requirements. In this case, a transmission UE considers that there is a time before t+X 1600 and waits for generation of contiguous resources. X is set to be less than T.

Further, the time x+T 1600 can be represented as a "first time".

Here, although radio resources 1610 that can be used in subchannels M+1 and M+3 are present at a time t+1 after data/packet arrival, they are non-contiguous resources and thus sidelink communication is not performed through the radio resources 1610. At a time t+3, contiguous subchannels M+1 and M+2 are present and thus sidelink communication is performed through corresponding radio resources 1620.

In other words, the transmission UE in FIG. 16 can determine a transmission time based on whether a plurality of contiguous subchannels is allocated to radio resources before the first time 1600. Specifically, since the plurality of subchannels 1620 is allocated to radio resources before the first time 1600 in the example of FIG. 16, sidelink communication can be started through the plurality of subchannels 1620. The first time 1600 can be determined based on transmission data latency and/or a transmission data size. For example, if transmission data needs to be transmitted with low latency, the first time can be approached to the data/packet arrival time t in order not to wait for contiguous subchannels for a long time. In the case of a large transmission data size, the first time can be approached to the data/packet arrival time t in order not to wait for contiguous subchannels for a long time. The first time may be determined by the transmission UE itself or determined by the transmission UE based on a latency threshold value and/or a size threshold value signaled by the network (e.g., a base station). Such characteristics of the first time are equally applied to examples below.

The example of FIG. 16 will be described based on FIG. 12. The transmission UE may acquire information related to radio resources allocated for sidelink through step S1210 and then confirm/determine/check that blocks represented by slanted lines in FIG. 16 have been allocated. Thereafter, data/packets are generated and a data/packet arrival time is confirmed through step S1230, and radio resources for the data are allocated/determined through step S1240. That is, the subchannels 1620 in FIG. 16 are used for sidelink communication through step S1240.

Figure 17:
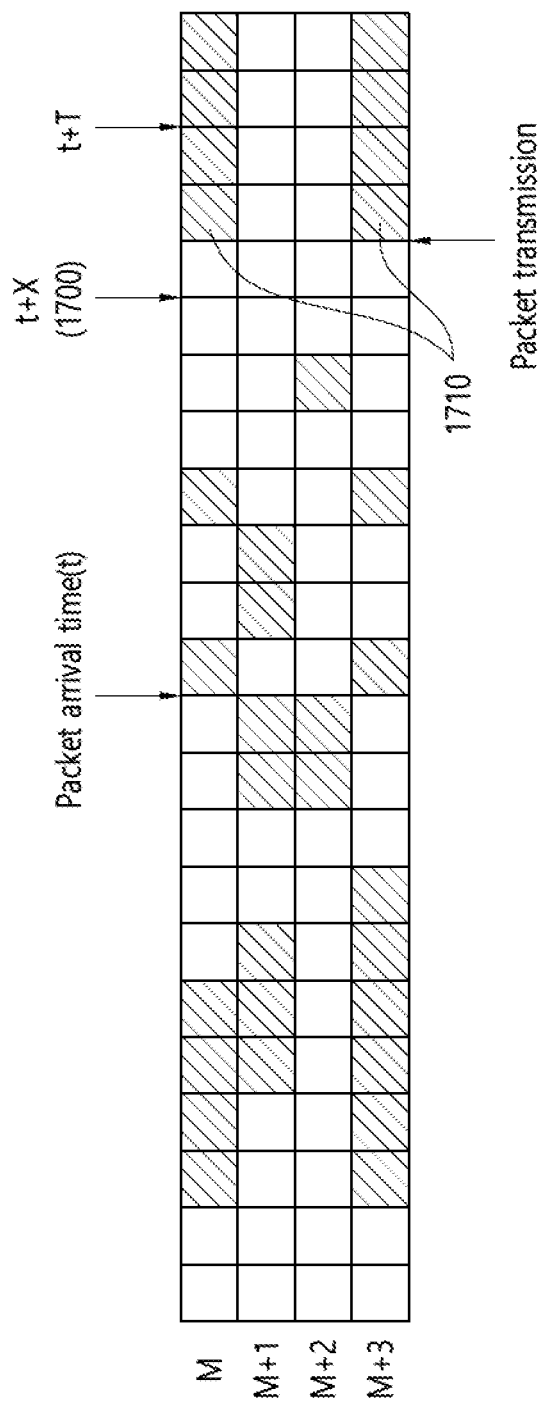
FIG. 17 shows an example in which data/packets are transmitted at a different time in a situation in which the same radio resources as those of FIG. 16 have been allocated.

FIG. 17 shows an example in which data/packets are transmitted at a different time in a situation the same radio resources as those of FIG. 16 are allocated. Although subchannels, that is, radio resources, allocated to the transmission UE are the same as those in the example of FIG. 16 in the example of FIG. 17, an arrival time of data/packet for sidelink is different from that in the example of FIG. 16. In the example of FIG. 17, if resources that can be transmitted are present after a time t+X 1700 when contiguous resources are not present for the time X that is the threshold value, the resources are used even though they are not contiguous in order to prevent a case in which data/packets cannot be transmitted because contiguous subchannels are not present.

Specifically, as shown in FIG. 17, data/packets are transmitted using non-contiguous resources 1710 at a time t+9 because two subchannels that can be contiguously used are not confirmed until the time t+X 1700. That is, the sidelink data/packets are transmitted through subchannels M and M+3 1710.

In other words, the transmission UE in FIG. 17 can determine a transmission time based on whether a plurality of contiguous subchannels is allocated to radio resources before the first time 1700. Specifically, since a plurality of subchannels is not allocated to radio resources before the first time 1700 in the example of FIG. 17, sidelink communication can be started after the first time 1700. More specifically, sidelink communication can be started through radio resources 1710 initially allocated after the first time 1700.

The example of FIG. 17 will be described based on FIG. 12. The transmission UE may acquire information related to radio resources allocated for sidelink through step S1210 and then confirm/determine/check that blocks represented by slanted lines in FIG. 16 have been allocated. Thereafter, data/packets are generated and a data/packet arrival time is confirmed through step S1230, and radio resources for the data are allocated/determined through step S1240. That is, the subchannels 1710 in FIG. 17 are used for sidelink communication through step S1240.

Figure 18:
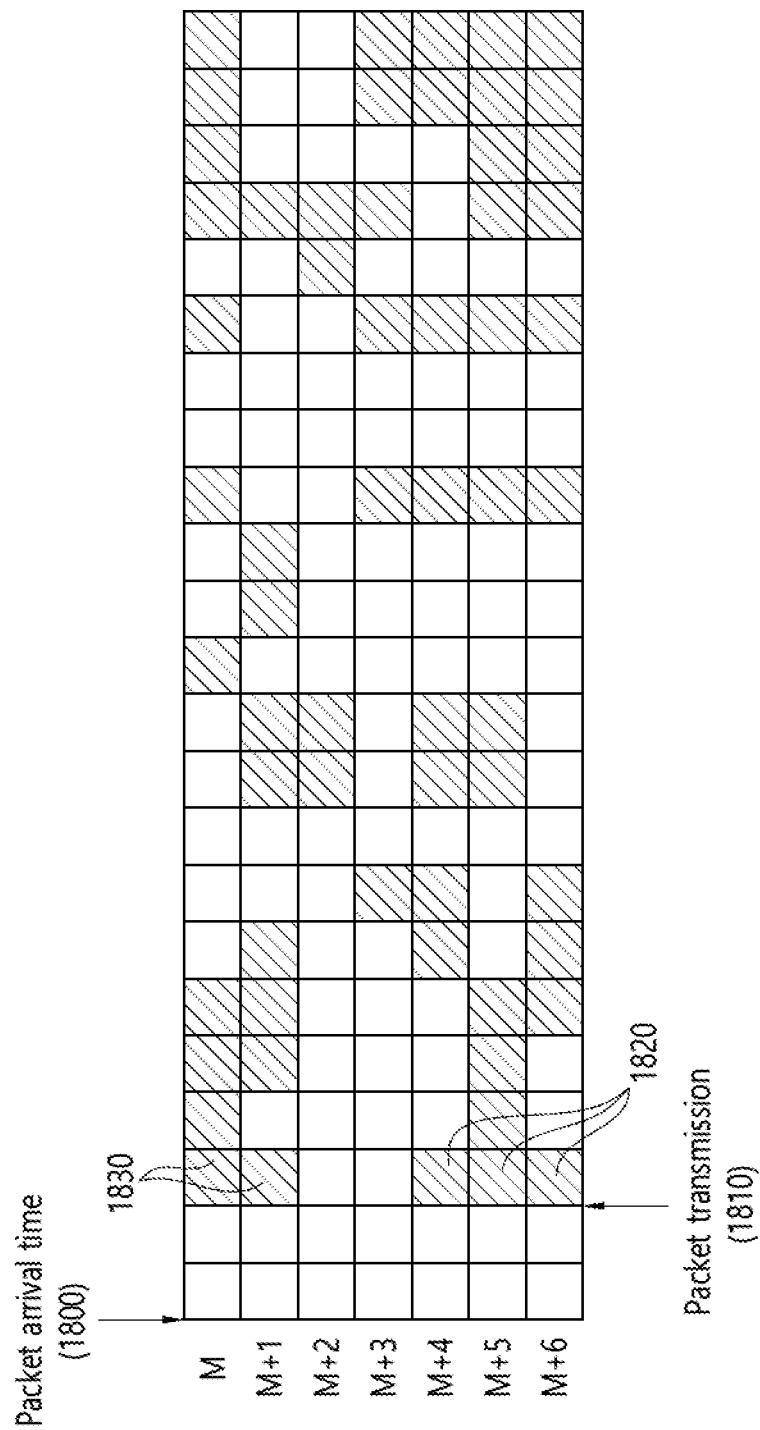
FIGS. 18 to 20 show examples in which data/packets are transmitted at different times in a situation in which the same radio resources have been allocated.
Figure 19:
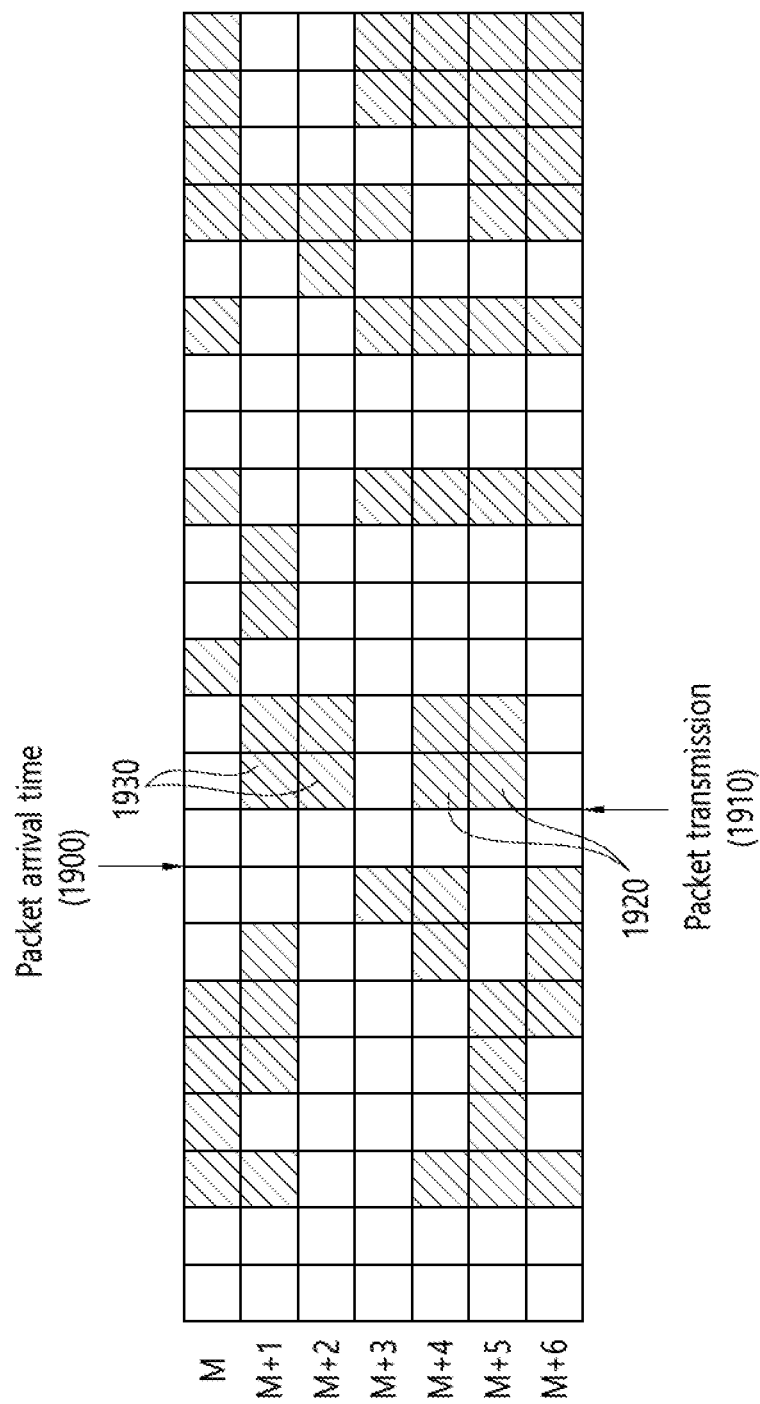
Figure 20:
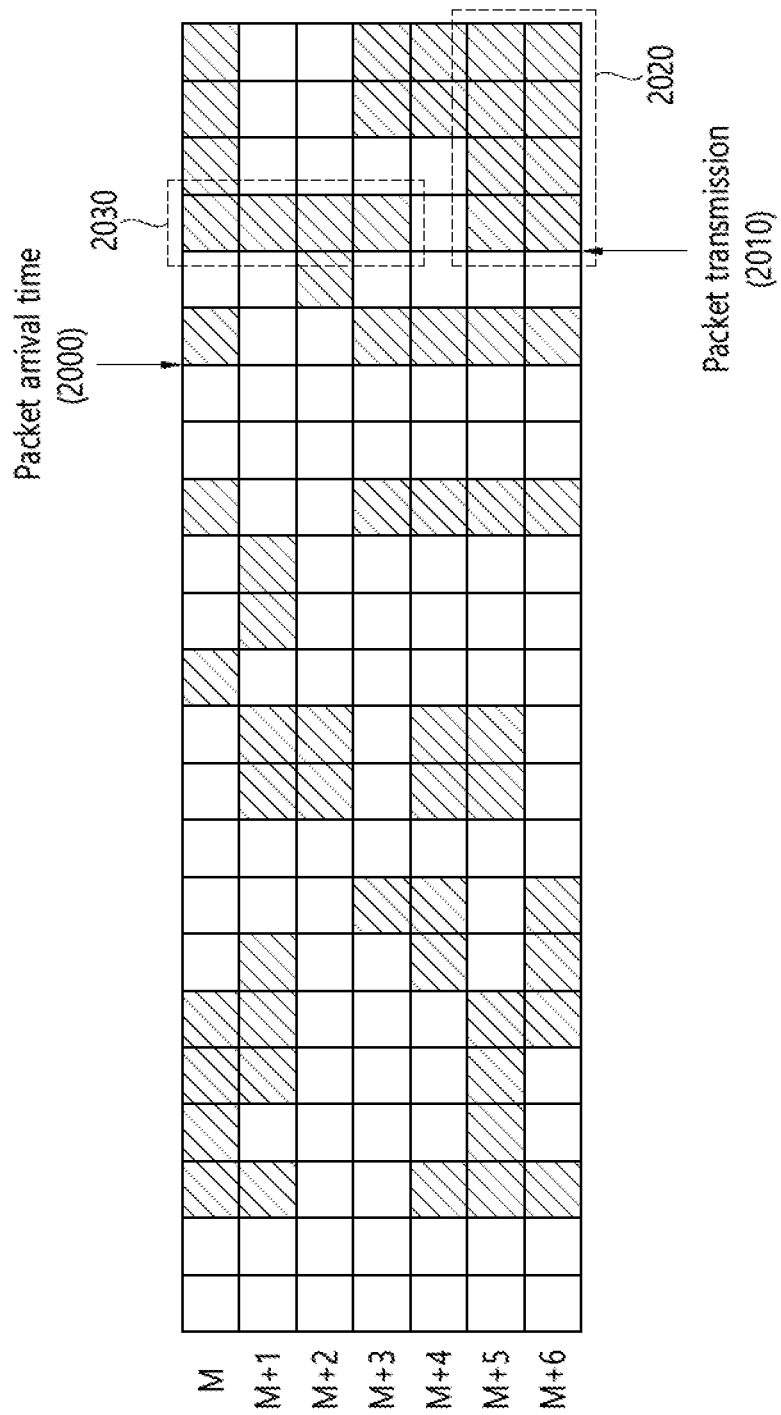

FIGS. 18 to 20 show examples in which data/packets are transmitted at different times in a situation in which the same radio resources are allocated. The examples of FIGS. 18 to 20 relate to cases in which there is a large number of subchannels that can be used by a transmission UE.

In the case of FIG. 18, the transmission UE can start sidelink communication through contiguous subchannels from among subchannels allocated after arrival 1800 of data/packets for sidelink. More specifically, a first subchannel 1820 and a second subchannel 1830 are allocated as contiguous subchannels but the first subchannel 1820 includes a larger number of contiguous subchannels, and thus it is desirable to start sidelink communication through the first subchannel 1820.

In the case of FIG. 19, the transmission UE can confirm that different subchannels 1920 and 1930 include the same number of channels after arrival 1900 of data/packets for sidelink. In this case, the transmission UE can determine subchannels to be used although a sidelink communication start time 1910 does not change. For determination of the transmission UE, the network (e.g., base station) can transmit physical layer signaling, higher layer signaling or a combination thereof. For example, even if the same number of subchannels are contiguous, priority may be assigned to a low frequency band, priority may be assigned to a high frequency band, or priority may be assigned to a specific subchannel.

In the case of FIG. 20, the transmission UE can acquire information related to a first radio resource 2030 having four contiguous subchannels and a second radio resource 2020 having two contiguous subchannels after arrival 2000 of data/packets for sidelink. In the case of determination based on the number of contiguous subchannels on a single time unit, sidelink communication can be started through the first radio resource 2030. However, considering a total number of subchannels on contiguous time units, it is more desirable to start transmission of the data/packets through the second radio resource because a larger amount of data/packets can be transmitted through the second radio resource 2020.

The above-described examples may be modified as follows. When the number of subchannels to be used by the transmission UE is large (e.g., when a relatively large packet needs to be transmitted), it may be difficult to discover contiguous resources as compared to a case in which the number of subchannels is smaller. In this case, it may be desirable to start data transmission even through non-contiguous subchannels by advancing the first time (i.e., t+X) (that is, by setting X to be small). Furthermore, the above-described examples may be modified into a method of transmitting data/packets whenever transmission resources are present irrespective of continuity when the number of subchannels to be used by the transmission UE is equal to or greater than a predetermined value.

Meanwhile, the examples of FIGS. 16 to 20 may be modified as shown in FIGS. 21 to 24.

In figures below, a block represented by slanted lines represents that a radio resource or a resource pool has been allocated to a corresponding transmission UE and a block represented by dots represents that a resource has been transmitted using an allocated resource. Further, a blank block represents that no resource is allocated to a transmission UE. In the figures of the present specification, the horizontal axis represents time and the vertical axis represents frequency unless otherwise mentioned.

Figure 21:
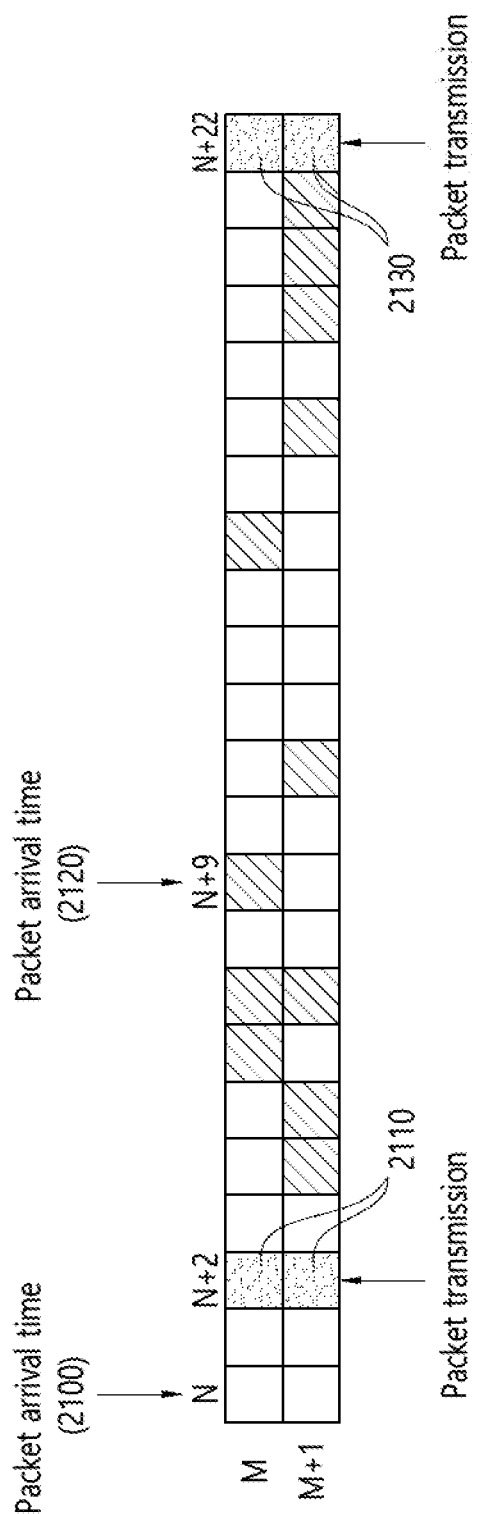
FIG. 21 shows an example of a case in which the number of subchannels used by a transmission UE is 2.

FIG. 21 shows an example related to a case in which the number of subchannels used by a transmission UE is 2. FIG. 21 shows an example when data/packets for sidelink arrive at a time N 2100 and a time N+9 2120. The transmission UE in FIG. 21 can start sidelink communication when contiguous subchannels are present similarly to the UE in FIGS. 18 to 20. More specifically, the transmission UE in FIG. 21 can start sidelink communication only when it is determined that a preset number of (e.g., 2) subchannels are contiguous. That is, with respect to first data/packet that has arrived at the time N 2100, sidelink communication can be started through subchannels 2110 allocated at a time N+2 because the preset number of subchannels are contiguous at the time N+2. Further, with respect to second data/packet that has arrived at the time N+9 2120, sidelink communication can be started through subchannels 2130 allocated at a time N+22 because the preset number of subchannels are contiguous at the time N+22. The number of subchannels to be used by the transmission UE can be determined by the transmission UE in consideration of at least one of the size of data/packet to be transmitted, permitted latency, and radio channel quality.

Figure 22:
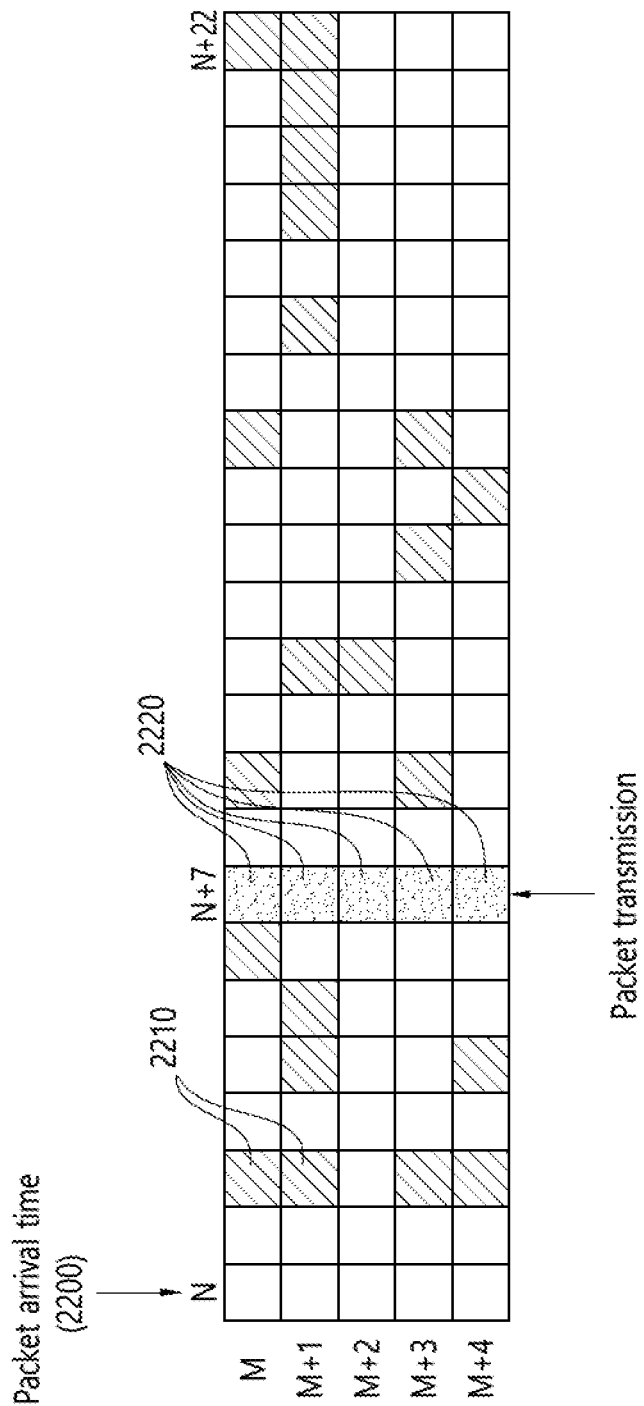
FIG. 22 shows an example of a case in which the number of subchannels used by a transmission UE is 5.

FIG. 22 shows an example related to a case in which the number of subchannels used by a transmission UE is 5. FIG. 22 shows an example when data/packet for sidelink arrives at a time N 2200. The transmission UE in FIG. 22 can start sidelink communication only when it is determined that a preset number of (e.g., 5) subchannels are contiguous. That is, with respect to data/packet that has arrived at the time N 2200, sidelink communication can be started through subchannels 2220 allocated at a time N+7 because the preset number of subchannels are contiguous at the time N+7. That is, sidelink communication may not be performed at the time N+2 because the preset number (e.g., 5) subchannels are not contiguous even though contiguous subchannels 2210 are present at the time N+2.

FIGS. 21 and 22 show examples in which the transmission UE performs sidelink communication through as many contiguous subchannels as a preset number. However, when the number of subchannels used by the transmission UE is large (e.g., when a relatively large packet needs to be transmitted), it may be difficult to discover contiguous resources as compared to a case in which the number of subchannels is smaller. That is, when contiguous resources are not allocated, the transmission UE can start sidelink communication using non-contiguous allocation.

Figure 23:
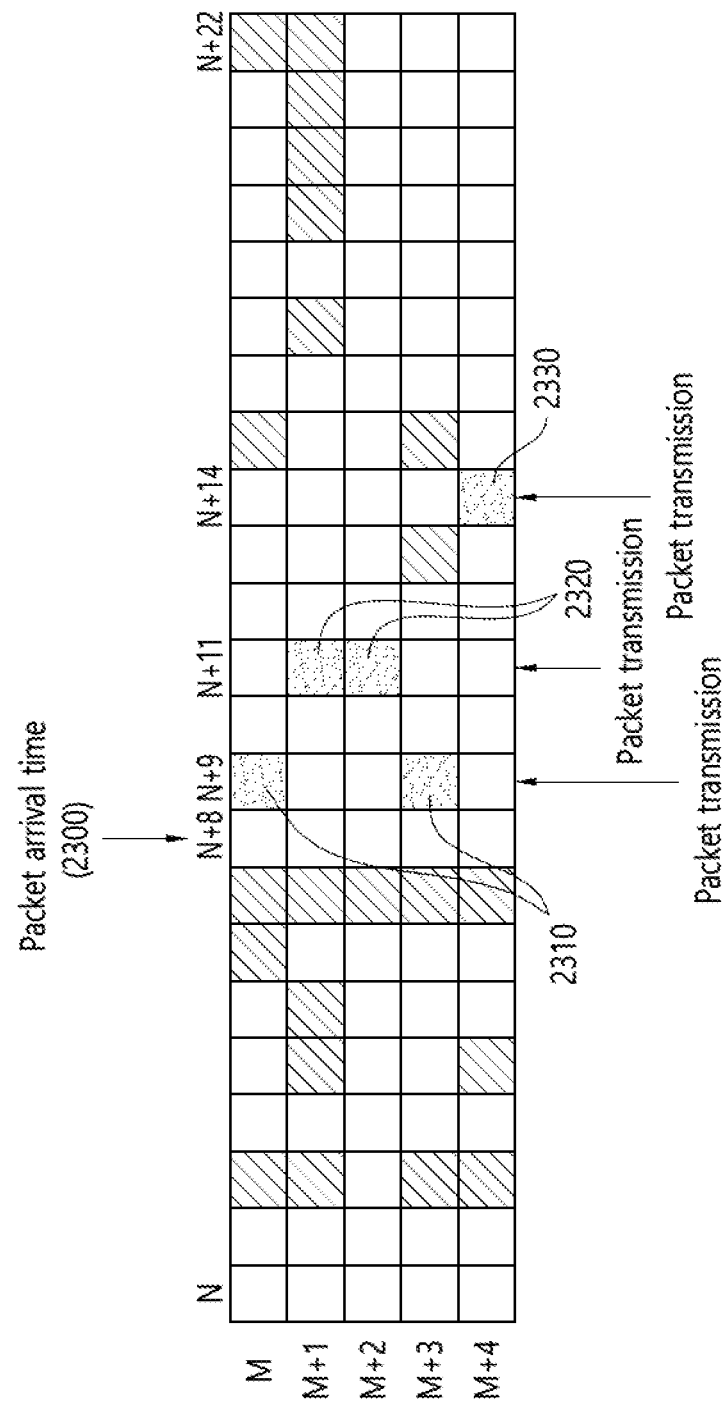
FIG. 23 shows an example in which a transmission UE performs sidelink (SL) communication using discontinuous allocation when contiguous resources are not allocated.

FIG. 23 shows an example in which a transmission UE performs sidelink communication using non-contiguous allocation when contiguous resources are not allocated. In FIG. 23, when it is assumed that data/packets for sidelink have arrived at a time N+8 2300, contiguous resources (i.e., contiguous subchannels) may not be present until a time N+22 (or also after N+22). In this case, when the transmission UE intends to wait for contiguous resources to perform sidelink communication using only contiguous subchannels, the transmission UE may not transmit data/packets within a latency budget of the data/packets to be transmitted. Accordingly, it is desirable to transmit the data/packets even through non-contiguous subchannels, as shown in FIG. 23. The aforementioned latency budget refers to a limit to which transmission can be delayed in consideration of latency with respect to transmitted data/packets.

More specifically, if subchannels 2310, 2302 and 2330 are allocated to different time units (e.g., TTIs, subframe, slots, or symbols), as shown in FIG. 23, it is desirable to transmit data/packets using the allocated resources. Here, the data/packets can be transmitted through a contiguous scheme or a non-contiguous scheme based on environments of available subchannels. For example, packets that have arrived at a time N+8 2300 may be transmitted in different TTIs (e.g., N+9, N+11 and N+14). In other words, when the transmission UE determines that a preset number of (e.g., 5) subchannels are not contiguously allocated for a preset time period after the time N+8 2300, radio resources closest to the time N+8 2300 (i.e., radio resources initially allocated after the time N+8) can be determined for the respective subchannels. That is, the transmission UE can determine that a first radio resource 2310 allocated at a time N+9 closest to the time N+8 2300 will be used for subchannels M and M+3, determine that a second radio resource 2320 allocated at a time N+11 will be used for subchannels M+1 and M+2 through the same method, and determine that a third radio resource 2330 allocated at a time N+14 will be used for a subchannel M+4 through the same method.

When the radio resources 2310, 2320 and 2330 allocated at different points in time are used, as shown in FIG. 23, the transmission UE may control transmit power in order to reduce interference with respect to other subchannels. For example, since sidelink communication is performed through three different time units (e.g., TTIs), total power can be divided by 3 and allocated to the respective radio resources 2310, 2320 and 2330. That is, power transmitted through each time unit can be obtained by dividing power when all subchannels to be used are used by the number (i.e., 3) of time units through which transmission is performed. The example of FIG. 23 can be additionally modified as follows.

Figure 24:
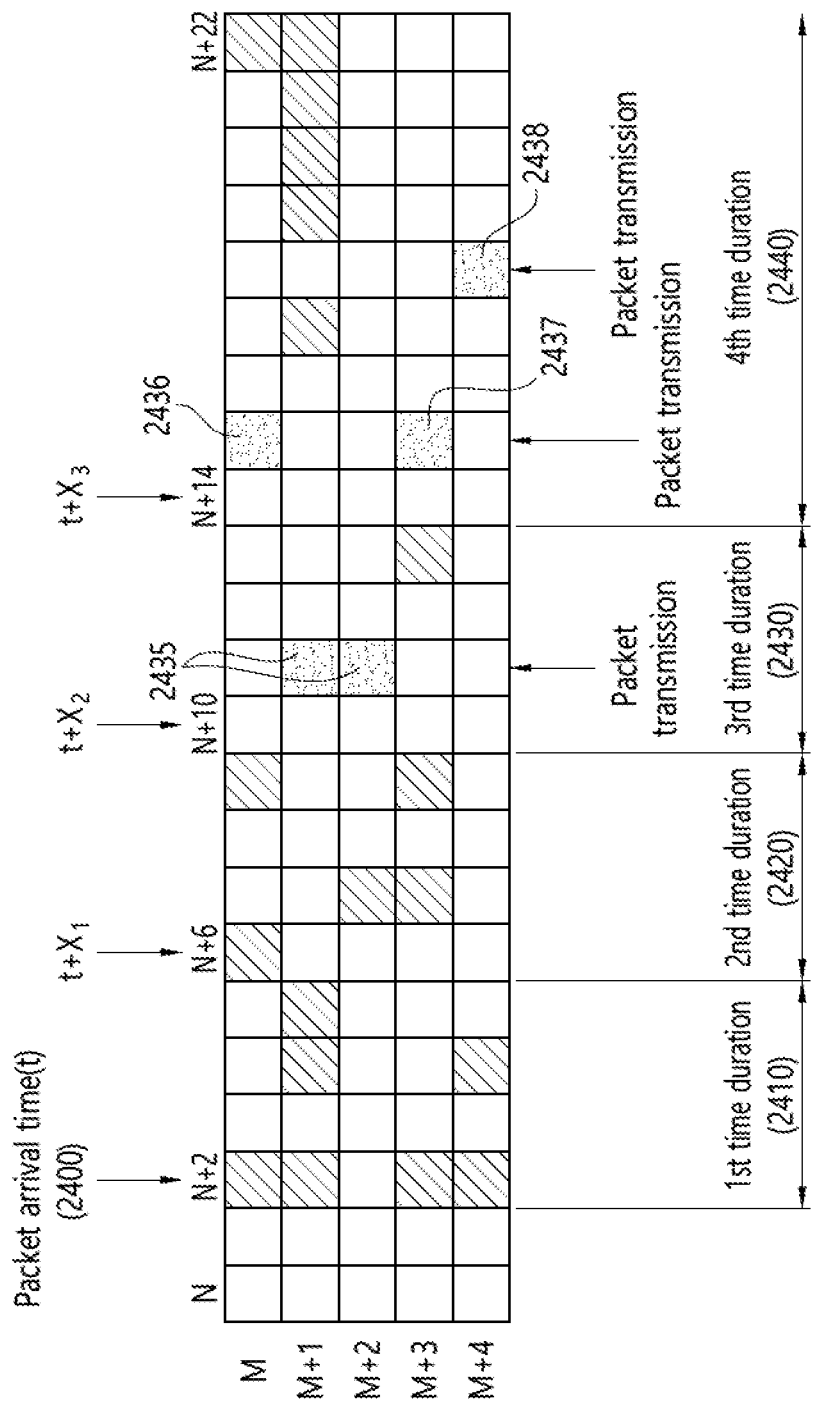
FIG. 24 is a diagram showing an additional example of performing sidelink (SL) communication.

FIG. 24 is a diagram showing an additional example of performing sidelink communication. FIG. 24 shows an example in which the number of subchannels used by a transmission UE is differently determined depending on time intervals. Specifically, first to fourth time intervals 2410, 2420, 2430 and 2440 can be defined, as shown in FIG. 24. N1 contiguous subchannels (e.g., four or more contiguous subchannels) can be allocated to the first time interval 2410, N2 contiguous subchannels (e.g., three contiguous subchannels) can be allocated to the second time interval 2420, and N3 contiguous subchannels (e.g., two contiguous subchannels) can be allocated to the third time interval 2430. In the example of FIG. 24, the first time interval 2410 may be a time interval between t and t+X1, the second time interval 2420 may be a time interval between t+X1 and t+X2, the third interval 2430 may be a time interval between t+X2 t+X3, and the fourth time interval 2440 may be a time interval after X3 when a data/packet arrival time 2400 is represented by t. In FIG. 24, it can be assumed that X1=4, X2=8 and X3=12. Further, although not shown in FIG. 24, it may be determined that data/packets need to be transmitted before a time t+T when latency of the data/packet is considered as described with reference to FIG. 14. In this case, the time units satisfy conditions of X1<X2<X3<T.

First, the transmission UE acquires information related to radio resources allocated in a pattern of FIG. 24. Referring to FIG. 12, the transmission UE may acquire information related to radio resources allocated for sidelink through step S1210.

Data/packets arrive at the transmission UE at a time t 2400. Referring to FIG. 12, the transmission UE generates data/packets and check the arrival time t through step S1230.

Thereafter, the transmission UE specifies radio resources for transmitting the generated data/packets. Referring to FIG. 12, the transmission UE may specify the radio resources for sidelink communication through step S1240. Specifically, the transmission UE determines whether more than (greater than or equal to) a first number of (i.e., 4) subchannels have been contiguously allocated to the first time interval 2410 in the frequency domain and starts sidelink communication through the corresponding subchannels when the subchannels have been contiguously allocated. However, more than (greater than or equal to) the first number of (i.e., 4) subchannels have not been contiguously allocated to the first time interval 2410 in the frequency domain in the case of FIG. 24. Accordingly, the transmission UE does not start sidelink communication in the first time interval 2410. Meanwhile, the first time interval 2410 may be represented as a time interval before a first time.

Thereafter, the transmission UE determines whether more than (greater than or equal to) a second number of (i.e., 3) subchannels have been contiguously allocated to the second time interval 2420 in the frequency domain and starts sidelink communication through the corresponding subchannels when the subchannels have been contiguously allocated. In the case of FIG. 24, more than (greater than or equal to) the second number of (i.e., 3) subchannels have not been contiguously allocated to the second time interval 2420 in the frequency domain. Accordingly, the transmission UE does not start sidelink communication in the second time interval 2420. Meanwhile, the second time interval 2420 may be represented as a time interval before a second time.

Then, the transmission UE determines whether more than (greater than or equal to) a third number of (i.e., 2) subchannels have been contiguously allocated to the third time interval 2430 in the frequency domain. As a result of determination, the transmission UE confirms that subchannels M+1 and M+2 are contiguous and starts sidelink communication through the subchannels 2435.

Since data communication can be started in the fourth time interval 2440 even through one subchannel, data communication is started through a separate subchannel. Specifically, the transmission UE starts sidelink communication through a radio resource initially allocated after start of the fourth time interval. For example, a subchannel 2436 present at a time N+15 is selected as a radio resource for sidelink communication for a subchannel M, and a subchannel 2437 present at the time N+15 is selected as a radio resource for sidelink communication for a subchannel M+3. In addition, a subchannel 2438 present at a time N+18 is selected as a radio resource for sidelink communication for a subchannel M+4.

The above-described examples have the following technical effects. First, it is possible to prevent data/packet transmission that requires low-latency communication from being unreasonably delayed because it is determined whether to use contiguous frequency resources or non-contiguous frequency resources in consideration of data/packet latency. In addition, in some of the above-described examples, contiguous allocation or non-contiguous allocation is selected based on whether a preset number of subchannels are contiguously set before a specific time (e.g., the first time), and thus contiguous allocation or non-contiguous allocation can be selected based on a simple criterion for determination. In addition, since different numbers of subchannels are allocated to a plurality of time intervals and a sidelink data/packet transmission time is determined according thereto as in the example of FIG. 24, it is possible to prevent data/packet transmission from being unreasonably delayed even when resource pools in various patterns are allocated.

The basic rule applied to the above-described examples is that non-contiguous allocation can be allowed such that data/packets can be divided and transmitted in frequency or time resources in consideration of a latency budget although contiguous allocation is preferentially used when there are contiguous resources.

In addition, although cases in which data/packets are immediately transmitted when available resources are generated are assumed in the above-described examples, the principle of the present disclosure is not limited thereto. More generally, the above-described criterion for determination of available resources and operations according thereto can also be applied to criteria for determination of whether specific resources are available in other channel access schemes and/or whether transmission can be performed at a specific time and operations according thereto. For example, a transmission UE can use the following channel access scheme in order to avoid collision with other transmission UEs at a corresponding position at the time of packet transmission when other transmission UEs are present around the transmission UE.

Each transmission UE may set a small number of (K) subchannels through which data/packets can be transmitted when a latency budget has a margin to prevent overlap of subchannels. However, when each UE intends to transmit data/packets using only allocated subchannels, the data/packets may not be transmitted within a latency budget thereof when K is small. In this case, it is possible to increase a likelihood of each UE transmitting data/packets by gradually increasing K over time (even through the number of subchannels shared by UEs increases).

Meanwhile, although cases in which data/packets are immediately transmitted when available resources are generated in the above-described examples, the method of the present specification is not limited thereto. More generally, the above-described criterion for determination of available resources and operations according thereto can also be applied to criteria for determination of whether specific resources are available in other channel access schemes and/or whether transmission can be performed at a specific time and operations according thereto. For example, a transmission UE can use the following channel access scheme in order to avoid collision with other transmission UEs at a corresponding position at the time of packet transmission when other transmission UEs (i.e., V2X/D2D UEs) are present around the transmission UE. Each UE can operate to initialize a backoff counter as a randomly selected value when data/packet has arrived, to reduce the counter value when an available resource is observed and to transmit data/packet when the counter becomes 0. Alternatively, when an available resource is observed in a situation in which data/packets have arrived, a transmission UE may operate to stochastically determine whether to use the resource.

Figure 25:
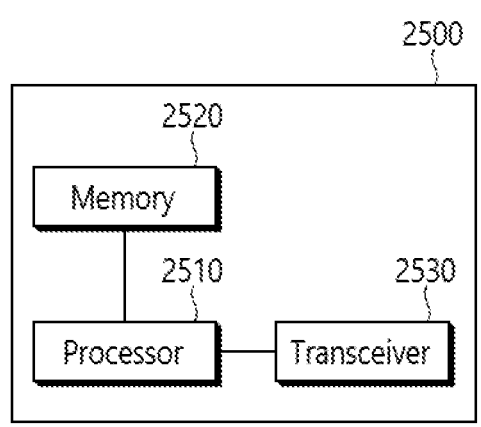
FIG. 25 shows an example of a transmission UE to which an example of the present specification is applied.

FIG. 25 shows an example of a transmission UE to which an example of the present specification is applied.

Referring to FIG. 25, a transmission UE 2500 includes a processor 2510, a memory 2520, and a transceiver 2530. The shown processor, memory and transceiver may be realized as separate chips or at least two or more blocks/functions may be realized as a single chip. The transceiver 2530 performs signal transmission and reception operations.

The processor 2510 may implement the functions, processes, and/or methods proposed in the present specification. The processor 2510 may operate based on the foregoing description. The processor 2510 may include an application-specific integrated circuit (ASIC), a separate chipset, a logic circuit, and a data processor. The memory 2520 may include a read-only memory (ROM), a random access memory (RAM), a flash memory, a memory card, a storage medium, and/or other storage devices.

Figure 26:
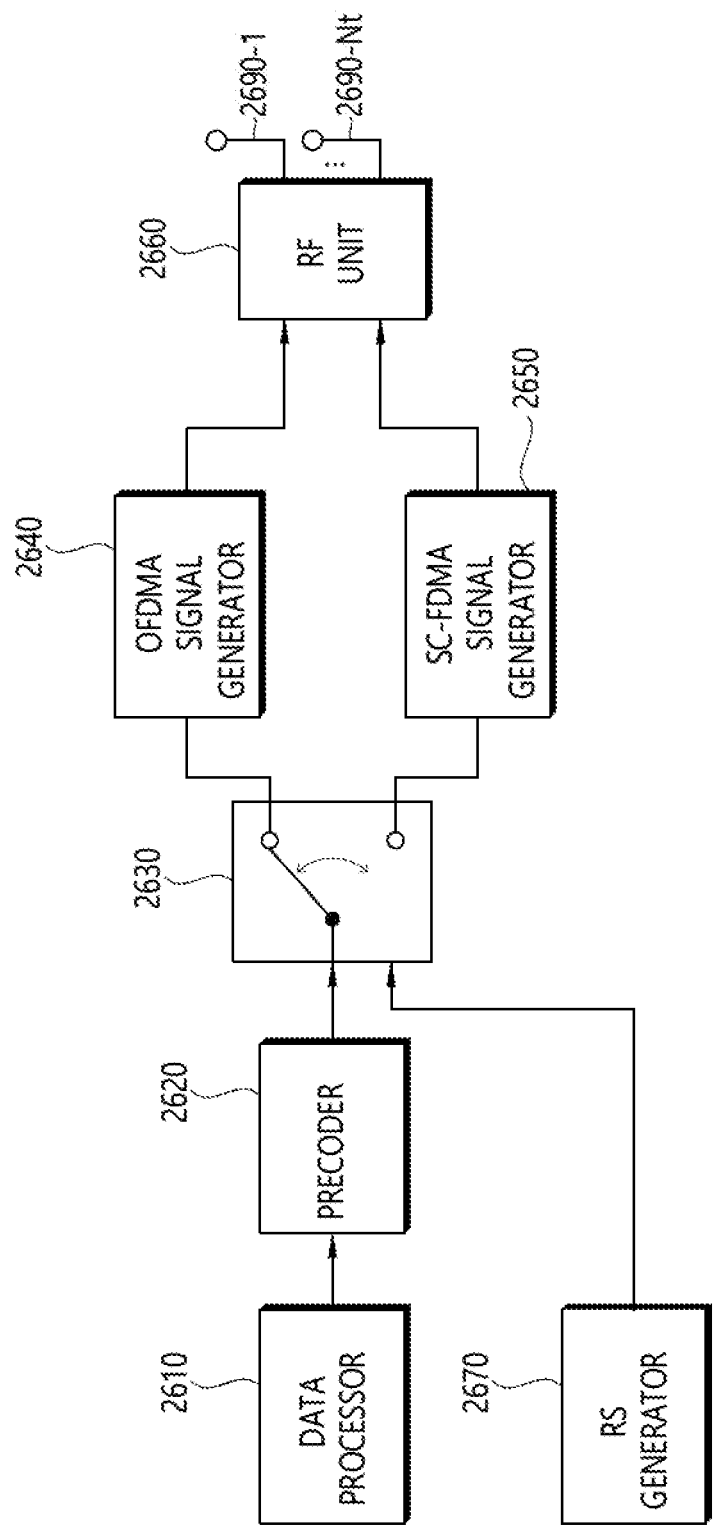
FIG. 26 shows an example of a processor applied to a transmission UE of the present specification.

FIG. 26 shows an example of a processor applied to the transmission UE of the present specification.

Referring to FIG. 26, the processor 2510 of FIG. 25 includes a data processor 2610, a precoder 2620, a signal exchanger 2630, an OFDMA signal generator 2640, an SC-FDMA signal generator 2650, and a reference signal generator 2670. The components of the block diagram of FIG. 26 are not essential components and some components may be omitted.

The data processor 2610 performs the above-described examples (representatively, operations of the steps of FIG. 12). That is, the data processor 2610 may acquire information related to a resource pool (RP) and determine radio resources (i.e., subchannels) for sidelink communication in consideration of a data/packet arrival time, latency, and the like. The reference signal generator 2670 generates a reference signal. The precoder 2620 performs precoding on a data stream generated by the data processor 2610. The signal exchanger 2630 selects an OFDM(A) mode operation or an SC-FDM(A) mode operation based on an instruction of the data processor 2610. As described above, the SC-FDM modulation scheme can be selected when contiguous subchannels are used and the OFDM modulation scheme can be selected non-contiguous subchannels are used. The OFDM(A) signal generator 2640 generates a time domain signal modulated based on OFDM(A). The SC-FDM(A) signal generator 2650 generates a time domain signal modulated based on SC-FDM(A). The time domain signal is converted into a radio signal through the transceiver 2530 and 2660 and transmitted through multiple transmit antennas 2690-1 to 2690-Nt.

Figure 27:
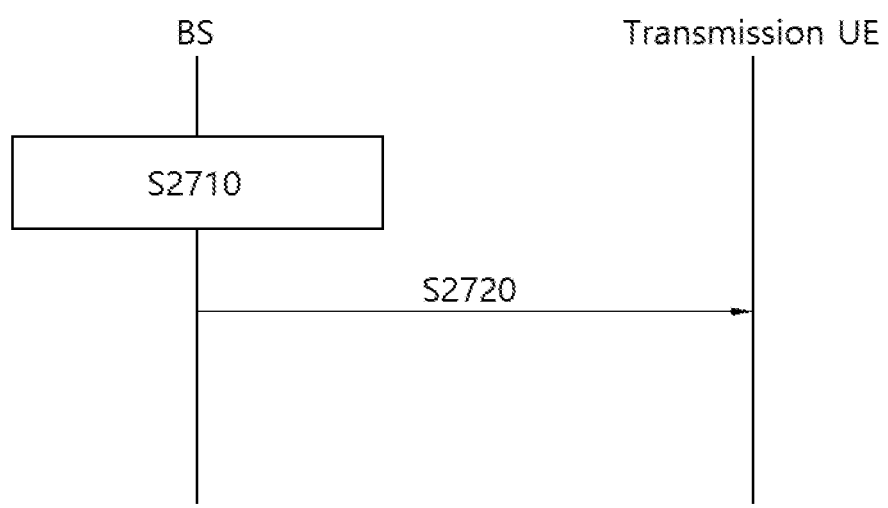
FIG. 27 shows operation of a base station to which an example of the present specification is applied.

FIG. 27 shows operation of a base station to which an example of the present specification is applied.

A base station based on the present specification can signal various types of information to a transmission UE. For example, the base station can signal information related to a resource pool as shown in FIG. 11. Further, the base station can signal additional information related to which subchannel 1920 or 1930 will be selected in the example of FIG. 19.

Figure 28:
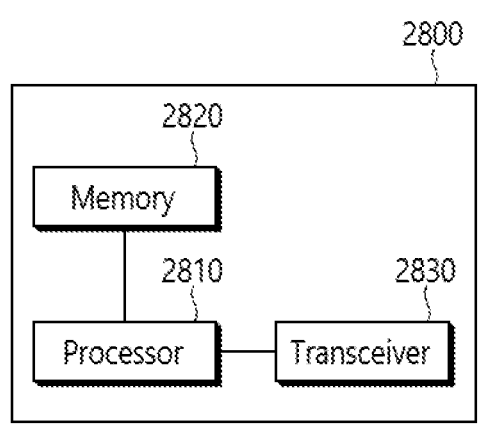
FIG. 28 shows an example of a base station an example of the present specification is applied.

FIG. 28 shows an example of a base station to which an example of the present specification is applied.

Referring to FIG. 28, a base station 2800 includes a processor 2810, a memory 2820, and a transceiver 2830. The shown processor, memory and transceiver may be realized as separate chips or at least two or more blocks/functions may be realized as a single chip. The transceiver 2830 performs signal transmission and reception operations.

The processor 2810 may implement the functions, processes, and/or methods proposed in the present specification. The processor may generate control information related to a resource pool (RP) or information for operations of other transmission UEs for a transmission UE. The processor 2810 may include an application-specific integrated circuit

The invention claimed is:

1. A method for a sidelink of a wireless communication system, performed by a transmission user equipment (UE), the method comprising:
acquiring information related to radio resources allocated for the sidelink, the radio resources including a plurality of subchannels and a plurality of time units;
generating data to be transmitted through the radio resources; and
starting transmission of the data based on the radio resources,
wherein, based on whether a plurality of contiguous subchannels is allocated to radio resources before a first time from among the radio resources, the transmission UE starts transmission of the data through the plurality of contiguous subchannels or starts transmission of the data after the first time,
wherein the transmission UE starts transmission of the data through more than a first number of subchannels, based on more than the first number of subchannels being contiguously allocated on a frequency domain before the first time, and
wherein the transmission UE starts transmission of the data through a radio resource initially allocated after the first time, based on more than the first number of subchannels not being contiguously allocated on the frequency domain before the first time.

2. The method of claim 1, wherein the first time is determined based on latency of the data and/or a size of the data.

3. The method of claim 1, wherein a second time is defined after the first time in the radio resources,
the transmission UE starts transmission of the data through more than a second number of subchannels, which is less than the first number, when more than the second number of subchannels are contiguously allocated in the frequency domain between the first time and the second time, and
the transmission UE starts transmission of the data through a radio resource initially allocated after the second time when less than the second number of subchannels are contiguously allocated in the frequency domain between the first time and the second time.

4. The method of claim 1, wherein the information related to the radio resources allocated for the sidelink is acquired from a base station.

5. The method of claim 1, wherein each of the subchannels includes one or a plurality of contiguous resource blocks (RBs), and each of the time units is at least one of a subframe, a symbol and/or a transmission time interval (TTI).

6. The method of claim 1, wherein the transmission of the data is performed based on a physical SL shared channel (PSSCH).

7. The method of claim 1, wherein the data is modulated based on single-carrier frequency division multiplexing (SC-FDMA) when the data is transmitted through a plurality of contiguous subchannels, and wherein the data is modulated based on orthogonal frequency division multiplexing (OFDM) when the data is transmitted through a plurality of non-contiguous subchannels.

8. A user equipment (UE) supporting a sidelink, comprising:
a transceiver configured to transmit and receive radio frequency (RF) signals; and
a processor connected to the transceiver and configured to control the transceiver,
wherein the processor is configured:
to acquire information related to radio resources allocated for the sidelink, the radio resources including a plurality of subchannels and a plurality of time units;
to generate data to be transmitted through the radio resources; and
to control the transceiver to start transmission of the data based on the radio resources,
wherein the processor is further configured to, based on whether a plurality of contiguous subchannels is allocated to radio resources before a first time from among the radio resources, start transmission of the data through the plurality of contiguous subchannels or start transmission of the data after the first time,
wherein the transmission UE starts transmission of the data through more than a first number of subchannels, based on more than the first number of subchannels being contiguously allocated on a frequency domain before the first time, and
wherein the transmission UE starts transmission of the data through a radio resource initially allocated after the first time, based on more than the first number of subchannels not being contiguously allocated on the frequency domain before the first time.

9. The UE of claim 8, wherein the first time is determined based on latency of the data and/or a size of the data.

10. The UE of claim 8, wherein a second time is defined after the first time in the radio resources,
the processor starts transmission of the data through more than a second number of subchannels, which is less than the first number, when more than the second number of subchannels are contiguously allocated in the frequency domain between the first time and the second time, and
the processor starts transmission of the data through a radio resource initially allocated after the second time when less than the second number of subchannels are contiguously allocated in the frequency domain between the first time and the second time.

11. The UE of claim 8, wherein the information related to the radio resources allocated for the sidelink is acquired from a base station.

12. The UE of claim 8, wherein each of the subchannels includes one or a plurality of contiguous resource blocks (RBs), and each of the time units is at least one of a subframe, a symbol and/or a transmission time interval (TTI).

13. The UE of claim 8, wherein the transmission of the data is performed based on a physical SL shared channel (PSSCH).

14. The UE of claim 8, wherein the data is modulated based on single-carrier frequency division multiplexing (SC-FDMA) when the data is transmitted through a plurality of contiguous subchannels and modulated based on orthogonal frequency division multiplexing (OFDM) when the data is transmitted through a plurality of non-contiguous subchannels.

15. The method of claim 1, wherein the transmission UE is configured to communicate with at least one of a reception UE, a wireless communication server, and/or an autonomous vehicle.

16. The UE of claim 8, wherein the transceiver is further configured to communicate with at least one of a reception UE, a wireless communication server, and/or an autonomous vehicle.

\* \* \* \* \*